United States Patent
Jain et al.

(10) Patent No.: US 9,924,386 B2
(45) Date of Patent: Mar. 20, 2018

(54) METHOD AND SYSTEM FOR WIRELESS NETWORK OPTIMIZATION AND REMOTE CONTROL OF MOBILE HANDSET OPERATION

(71) Applicant: Orchestra Technology, Inc., Richardson, TX (US)

(72) Inventors: Anuj Jain, Dallas, TX (US); Jairaj Hedge, Southlake, TX (US)

(73) Assignee: Orchestra Technology, Inc., Richardson, TX (US)

( * ) Notice: Subject to any disclaimer, the term of this patent is extended or adjusted under 35 U.S.C. 154(b) by 0 days.

(21) Appl. No.: 15/188,713

(22) Filed: Jun. 21, 2016

(65) Prior Publication Data

US 2016/0373944 A1    Dec. 22, 2016

Related U.S. Application Data

(60) Provisional application No. 62/182,960, filed on Jun. 22, 2015.

(51) Int. Cl.
*H04W 24/00* (2009.01)
*H04W 24/02* (2009.01)
(Continued)

(52) U.S. Cl.
CPC ......... *H04W 24/02* (2013.01); *H04L 41/5032* (2013.01); *H04L 41/5038* (2013.01); *H04L 41/5074* (2013.01); *H04L 43/08* (2013.01); *H04L 43/50* (2013.01); *H04L 65/1059* (2013.01); *H04L 65/80* (2013.01); *H04M 3/2236* (2013.01); *H04W 24/06* (2013.01); *H04L 43/0829* (2013.01); *H04L 43/0852* (2013.01); *H04L 43/0888* (2013.01); *H04M 2203/053* (2013.01); *H04M 2207/18* (2013.01); *H04W 24/10* (2013.01)

(58) Field of Classification Search
CPC ... G06F 11/3688; H04W 24/08; H04W 24/02; H04W 24/06; H04W 24/10
See application file for complete search history.

(56) References Cited

U.S. PATENT DOCUMENTS

2007/0006154 A1 *  1/2007  Yang ................... G06F 11/3636
                                                                717/124
2009/0027481 A1 *  1/2009  Joung ..................... H04L 41/04
                                                                348/14.02

(Continued)

*Primary Examiner* — Ronald Eisner
(74) *Attorney, Agent, or Firm* — Munck Wilson Mandala, LLP

(57) ABSTRACT

A system for wireless network optimization and remote control of mobile handset operation, comprising one or more devices disposed on a network and a server disposed on the network having a database, the server configured to push a client application to the one or more devices, instruct the client application to perform a plurality of tests on the one or more devices, collect a plurality of reports corresponding the plurality of tests performed on the on the one or more devices, instruct the client application to perform debugging tests on the one or more devices, collect debugging results corresponding to the debugging tests performed on the one or more devices, and remotely access the one or more devices to resolve any operational problems of the one or more devices.

6 Claims, 34 Drawing Sheets

(51) Int. Cl.
*H04W 24/06* (2009.01)
*H04M 3/22* (2006.01)
*H04L 29/06* (2006.01)
*H04L 12/24* (2006.01)
*H04L 12/26* (2006.01)
*H04W 24/10* (2009.01)

(56) References Cited

U.S. PATENT DOCUMENTS

2013/0215125 A1* 8/2013 Mahajan ........... H04M 1/72569
  345/522
2015/0081598 A1* 3/2015 Depizzol .............. G06N 99/005
  706/12

* cited by examiner

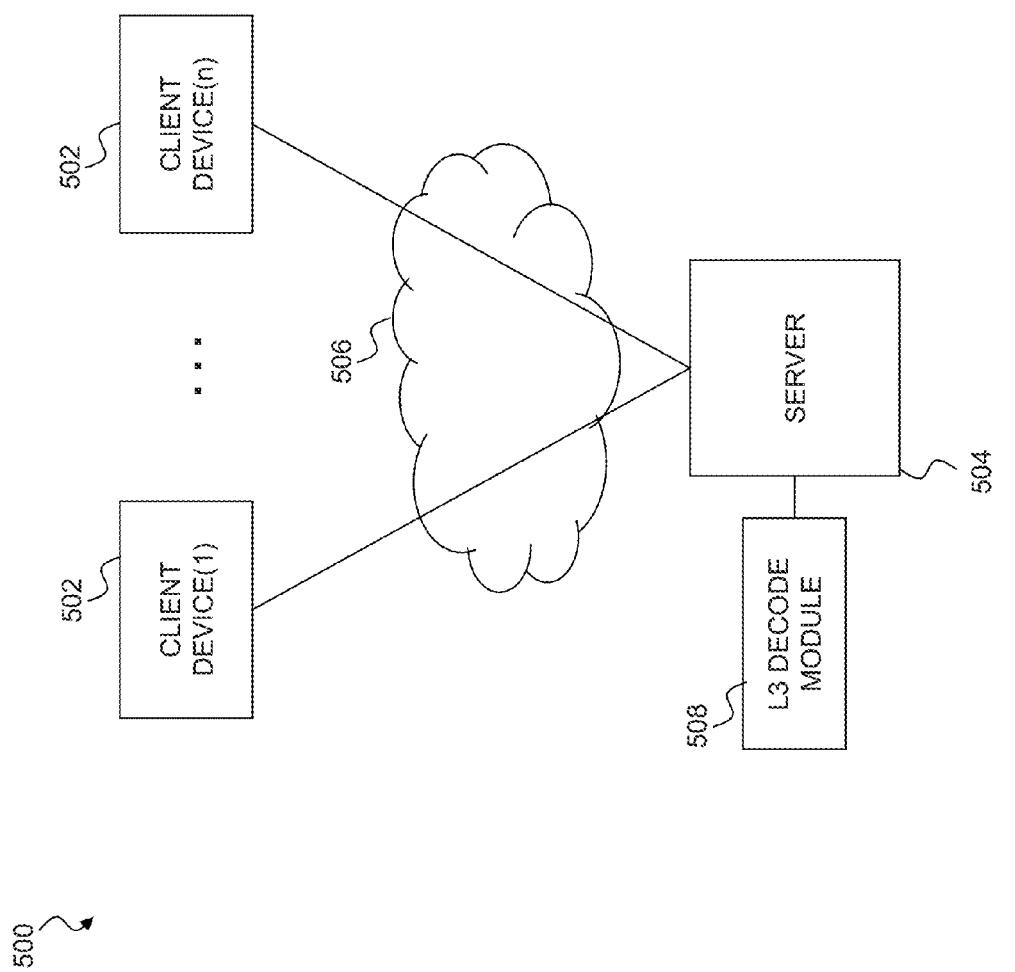

| KPI Summary for Last 30 Minutes | AT&T | Sprint | Verizon |
|---|---|---|---|
| Signal Strength (dBm) | -87.0 | -77.0 | 0.0 |
| Ping Latency | 108.67 | 78.79 | 0.0 |
| HTTP Download Throughput (Mbps) | 6.6 | 1.64 | 0.0 |
| HTTP Upload Throughput (Mbps) | 2.49 | 0.38 | 0.0 |
| Originating Voice Call Success Rate (%) | 100.0 | 100.0 | 0.0 |
| Originating Voice Call Setup Time(s) | 4.2 | 5.96 | 0.0 |
| Terminating Voice Call Success Rate (%) | 100.0 | 80.0 | 0.0 |
| Terminating Voice Call Setup Time(s) | 5.51 | 4.25 | 0.0 |

FIG. 8

| Device_Operator | ia_device_id | ia_localtime | ia_video_id | ia_video_duration | ia_video_resolution | ia_time_to_playback | ia_count_of_pause | ia_time_to_first_pause | ia_time_to_completion |
|---|---|---|---|---|---|---|---|---|---|
| TMO | 2234 | 1/16/2015 0:02 | kYfaHEcK88c | 46166 | 640*360 | 2519 | \N | 0 | 43647 |
| ATT | 2232 | 1/16/2015 0:02 | kYfaHEcK88c | 44253 | 640*360 | 764 | \N | 0 | 43468 |
| ATT | 1808 | 1/16/2015 0:02 | kYfaHEcK88c | 45387 | 640*360 | 3335 | \N | 0 | 43253 |
| TMO | 1798 | 1/16/2015 0:12 | kYfaHEcK88c | 46388 | 640*360 | 2615 | \N | 0 | 44373 |
| ATT | 2232 | 1/16/2015 0:12 | kYfaHEcK88c | 44222 | 640*360 | 1816 | \N | 0 | 43506 |
| ATT | 1808 | 1/16/2015 0:12 | kYfaHEcK88c | 48733 | 640*360 | 5028 | \N | 0 | 43205 |
| TMO | 2234 | 1/16/2015 0:12 | kYfaHEcK88c | 46414 | 640*360 | 2885 | \N | 0 | 43529 |
| TMO | 1798 | 1/16/2015 0:12 | kYfaHEcK88c | 47684 | 640*360 | 2782 | \N | 0 | 44902 |
| TMO | 2234 | 1/16/2015 0:22 | kYfaHEcK88c | 46977 | 640*360 | 3317 | \N | 0 | 43660 |
| ATT | 1808 | 1/16/2015 0:22 | kYfaHEcK88c | 44394 | 640*360 | 1252 | \N | 0 | 43142 |
| TMO | 1798 | 1/16/2015 0:22 | kYfaHEcK88c | 47982 | 640*360 | 2766 | \N | 0 | 45216 |
| TMO | 1798 | 1/16/2015 0:32 | kYfaHEcK88c | 46304 | 640*360 | 1695 | \N | 0 | 44609 |
| ATT | 2232 | 1/16/2015 0:32 | kYfaHEcK88c | 44269 | 640*360 | 797 | \N | 0 | 43472 |
| ATT | 1808 | 1/16/2015 0:32 | kYfaHEcK88c | 46851 | 640*360 | 3682 | \N | 0 | 43169 |
| TMO | 2234 | 1/16/2015 0:32 | kYfaHEcK88c | 45441 | 640*360 | 2029 | \N | 0 | 43412 |
| TMO | 2234 | 1/16/2015 0:42 | kYfaHEcK88c | 47647 | 640*360 | 4115 | \N | 0 | 43532 |
| TMO | 1798 | 1/16/2015 0:42 | kYfaHEcK88c | 46887 | 640*360 | 2030 | \N | 0 | 44857 |
| ATT | 2232 | 1/16/2015 0:42 | kYfaHEcK88c | 44495 | 640*360 | 1011 | \N | 0 | 43484 |
| ATT | 1808 | 1/16/2015 0:42 | kYfaHEcK88c | 45621 | 640*360 | 2466 | \N | 0 | 43155 |
| TMO | 2234 | 1/16/2015 0:52 | kYfaHEcK88c | 47106 | 640*360 | 3411 | \N | 0 | 43695 |
| ATT | 2232 | 1/16/2015 0:52 | kYfaHEcK88c | 44338 | 640*360 | 841 | \N | 0 | 43497 |
| ATT | 1808 | 1/16/2015 0:52 | kYfaHEcK88c | 45480 | 640*360 | 2244 | \N | 0 | 43236 |
| TMO | 1798 | 1/16/2015 0:52 | kYfaHEcK88c | 47109 | 640*360 | 3081 | \N | 0 | 44028 |

| Jerkiness [0-10] | Blockiness [0-10] | Blur [0-10] |
|---|---|---|
| 0.00 | 0.20 | 0.17 |

| PSNR Y [dB] | PSNR Cb [dB] | PSNR Cr [dB] | MOS |
|---|---|---|---|
| 45.33 | 45.62 | 45.71 | 4.01 |

| Avg Temporal Dist | Worst Temporal Dist | Frozen Frames [%] | Skipped Frames [%] |
|---|---|---|---|
| 0.00 | 0.00 | 0.00 | 0.00 |

| | Reference Signal | Test Signal |
|---|---|---|
| Number of Frames | 220 | 219 |
| Brightness [%] | 46 | 46 |
| Contrast [%] | 39 | 39 |
| Input Frame Rate [Hz] | 25.00 | 25.00 |
| Estimated Frame Rate [Hz] | 25.00 | 25.00 |
| P.910 Temporal Activity | 46.18 | 46.27 |
| P.910 Spatial Complexity | 146.13 | 145.06 |
| Is Still Video | No | No |

1314

1316

| ia_device_id | ia_voice_call_device_localtime | ia_event_type |
|---|---|---|
| 1323 | 12/16/2014 19:12:00 | Calling |
| 1323 | 12/16/2014 19:12:02 | Calling_Offhook |
| 1323 | 12/16/2014 19:23:33 | IDLE |

1318

| Timestamp | Connection | WiFi Signal Strength | LTE RSSI | VQT POLQA Score |
|---|---|---|---|---|
| 12/16/2014 19:12:10 | WiFi | -69 | -77 | 2.5 |
| 12/16/2014 19:16:10 | WiFi | -91 | -65 | 2.8 |
| 12/16/2014 19:17:10 | LTE | -200 | -69 | 3.7 |
| 12/16/2014 19:18:26 | LTE | -200 | -69 | 3.7 |
| 12/16/2014 19:18:28 | WiFi | -64 | -69 | 3.0 |
| 12/16/2014 19:18:32 | WiFi | -71 | -73 | 2.9 |

FIG. 13C

METHOD AND SYSTEM FOR WIRELESS NETWORK OPTIMIZATION AND REMOTE CONTROL OF MOBILE HANDSET OPERATION

CROSS-REFERENCE TO RELATED APPLICATIONS

This application claims benefit of U.S. Provisional Application No. 62/182,960, filed Jun. 22, 2015, entitled METHOD AND SYSTEM FOR WIRELESS NETWORK OPTIMIZATION AND REMOTE CONTROL OF MOBILE HANDSET OPERATION, the specification of which is incorporated by reference herein in its entirety.

TECHNICAL FIELD

The present invention relates generally to wireless network operations and in particular to wireless network optimization and remote control of mobile handset devices.

BACKGROUND

With the ever changing wireless cellular technology to offer the end consumer more advanced and flexible services, new radio technologies emerge frequently to meet that demand. Whether it is higher bandwidth requirement or additional applications and services, the mobile handset is becoming more and more complex in its functionality and its operation. It is crucial for a wireless service provider to keep the user experience and quality of service at the highest possible level, and avoid high churn factors that lead to loss of revenue and lower valuation. Maintaining the end consumer relationship with the network operator is key to the business success.

With such advancement, Mobile operators are faced with new challenges in supporting the mobile device and the cellular network as faster networks are deployed and as more capable devices are introduced. Such challenges include controlling and monitoring third party applications installed on the handset, managing radio coverage across different technologies in the same network and the same handset, and tracking consumer activities and specialized events. With the capability of installing applications, tools and other software on the mobile handset, proliferation of the mobile devices with these sophisticated capabilities increases the complexity of managing the devices, services and applications that reside on them. The cost of customer care of smart phones is rising as more support becomes necessary in configuring settings, setting of data, upgrading applications and programs. In addition, it is becoming more and more difficult to the network to control which applications are installed on the mobile device and what problem they may cause to the Operating System (OS), and eventually propagate the damage to other mobile devices, hence escalating the problem that may lead to unsolvable disasters. This problem is presently addressed by having the end consumer call customer service. A major drawback of this solution is the customer service representative does not have visibility on what applications are running on the mobile handset, and in most cases cannot resolve the problem over the phone. This requires the consumer to go to a local store where further investigation may be done, and in most cases lead to replacing the handset with a new one without solving the problem or narrowing down the source of the problem. This resolution process has been proven to be very long and requiring a long interaction with the end consumer whom then is impacted with bad quality of experience. What is needed is a method and system to facilitate the cellular network operations, drive operational cost down, and optimize the network in a dynamic, highly accurate and cost efficient way.

In addition, another problem is present in the wireless networks today when it comes to monitoring the performance of applications, especially the real-time applications such as voice and video calling, running on the mobile headsets in the field, and creating an association of that performance with the location of the mobile and the radio technology used at the time of running the application. This includes session setup delay, application crash rate, packet loss ratio and overall service quality. This is desperately needed for network and service performance optimizing that directly impacts the user experience and satisfaction leading to higher revenue and lower customer churn rates. There is no known solution that resolves this problem today for applications running on the handset.

Furthermore, with new radio technologies being deployed, constantly changing geography in cities while adding building, bridges and more, variation in mobile geographical population, and new cell site deployments, the cellular radio coverage quality and accuracy is regularly changing before, during and after a radio access technology is deployed. This causes a critical problem to the operator as where there is lack or weakness of radio coverage, there is a lack of service or at best a very bad quality service. This is one of main reasons end consumers may cancel a service subscription with the current operator, hence leading to loss of revenue to that operator. This problem is addressed today with a radio drive test service that network operators utilize. The radio drive test requires vehicles equipped with radio strength detectors to drive on the road and capture the radio strength in various areas of the network. The vehicles must drive and cover as much area as possible to make sure they gather enough data. This solution is extremely expensive and time consuming given that it requires owning, operating and servicing hundreds of fuel operated vehicles to drive long distances for multiple days, and in case of covering nation-wide networks, the cost becomes much higher. In addition, this solution does not cover inside buildings, private properties and areas where roads are not available, hence making the radio coverage map not accurate.

What is needed at the network operator is a method and solution for the network to get awareness of what applications are running on a specific mobile handset, and a capability to remotely control that mobile handset in order to resolve a specific problem or pro-actively prevent a problem from spreading to other applications and modules within the mobile handset, or spreading to other mobile handset devices within the network. This method should also allow the network operator to control a single mobile device as well as multiple mobile devices during a single session. In other words, sending a request or command from the network server to the mobile device must be allowed to be done on a single mobile handset, or automatically populated to multiple mobile handsets.

What is also needed is a method and system for the mobile handset to transmit data reports regularly, as well as upon request from the network, to a network entity server where the network operator may process the information and intelligently derive a solution to specific problems.

What is also needed is a method and solution to accurately capture the radio coverage and status in the complete network and optimize the network in its operation and design of radio coverage at a much lower cost and much faster turn-around than existing solutions used today.

What is also needed is a solution and method that may monitor and report performance information for applications running on the handset and an association of those statistics with the radio technology, location of the mobile handset and other handset parameters.

A need exists, therefore, for a solution to the many problems that the network operator is facing today with the ever evolving wireless service technology, and a solution that reduces the network operational cost dramatically. The solution described in the current disclosure addresses all the problems and offers an end to end solution in a cost effective implementation while meeting all the needs described above.

All references cited herein are incorporated by reference to the maximum extent allowable by law. To the extent a reference may not be fully incorporated herein, it is incorporated by reference for background purposes and indicative of the knowledge of one of ordinary skill in the art.

SUMMARY

The problems presented in present systems and methods are solved by the systems and methods described herein. The methods and systems described herein enable wireless network operators to accurately optimize the wireless network operation and maintenance, and to manage and control activities on the mobile handset devices. Mobile handsets are enabled to capture a set of operational information from the field, and transfer associated reports to a remote network server where post processing and analysis may take place. Reporting from the mobile handsets includes Radio Signal strength captured in any location at any time. This information is collected and reported with all the details to the network entity, effectively eliminating the radio drive test activities and all costs associated with it. In addition, mobile handsets report the utilized radio transceiver identity along with the radio signal strength allowing the network to accurately identify the handset elevation such as in cases where Wi-Fi is used. Furthermore, the network is enabled with the capability of using different command groups for different applications such as Customer care, Test automation, Emergency, Location, and Law Enforcement. The Command Group concept allows the network operator to issue single or multiple commands to a single or multiple handsets at one time.

An Intelligent Agent (IA or "intelli-agent") client is installed on the mobile handset and another agent is installed on the network server. The IA client on the mobile handset interacts with the appropriate modules and entities on the mobile handset to control the functions of the mobile handset and gather necessary information and operational statistics such as Radio Signal strength which is then included in a report created by the IA which in turn sends it to the network entity for analysis. The IA on the server side interacts with the appropriate modules on the server to communicate with the IA on the mobile client side. This method allows a network operator agent to use the IA on the server side to communicate with the mobile handset and effectively remotely control the handset operation, and issue commands such as to dial 911. In addition, the means to benchmark different entities used in the cellular technology such as Hardware, Firmware, operating system, common applications and more is enabled.

Accordingly a set of needs have arisen for Mobile Network Operators which may be stated as follows:

a) cost-effective mobile device management (MDM) which provides remote capabilities for device support and configuration of smart phones remotely. MDM features allow monitoring and recording of operational status of devices, configuring devices for voice, data and application (email) settings, provisioning over the air (OTA) updates to firmware, operating systems and operator-provided applications, and remote troubleshooting of smart phone devices;

b) automated testing capabilities which are invoked remotely against selected devices which enable benchmarking of device performance along multiple dimensions, comparison of handset models in terms of conformance with accepted industry thresholds and benchmarks; and c) network signal measurements to facilitate optimization of the RF network, from the perspective of devices and their locations, which enable identification of conditions and locations causing abnormal events, identification of geographic locations causing devices to lose coverage or enter roaming, and the identification of areas where devices thrash between access technologies.

The multi-platform Intelligent Agent (IA) meets all the needs described above, with set of features covering but not limited to Mobile Device Management (MOM) for Customer Care, Radio Frequency (RF) Measurement for Network Optimization, and Remotely Initiated Testing and Benchmarking Automation.

Additionally the IA facilitates and organizes collection of handset configuration data, handset service and usage characteristics, RF strength information and benchmark performance data as well as other operational information. Over time, as the repository of data collected grows, it may provide network operators with unique capabilities in drawing critical insights of the network dynamic status, enabling business growth, innovation and end-user customer satisfaction.

The IA is positioned as an open platform for the development of additional plug-ins to provide additional services useful to the mobile network operators and their smart mobile handset customers. Additional plug-ins may be developed and integrated in the overall end to end solution.

Other objects, features, and advantages of the method and system may become apparent with reference to the drawings and detailed description that follow.

BRIEF DESCRIPTION OF THE DRAWINGS

For a more complete understanding, reference is now made to the following description taken in conjunction with the accompanying Drawings in which:

FIG. 5 illustrates one embodiment of a layer decoding system;

FIG. 8 illustrates one embodiment of a SmartKIT device report;

FIG. 9B illustrates one embodiment of a YouTube™ customer experience report;

FIG. 13C illustrates one embodiment of a handover between VoWiFi and VoLTE voice quality score report;

DETAILED DESCRIPTION

Figure 1:
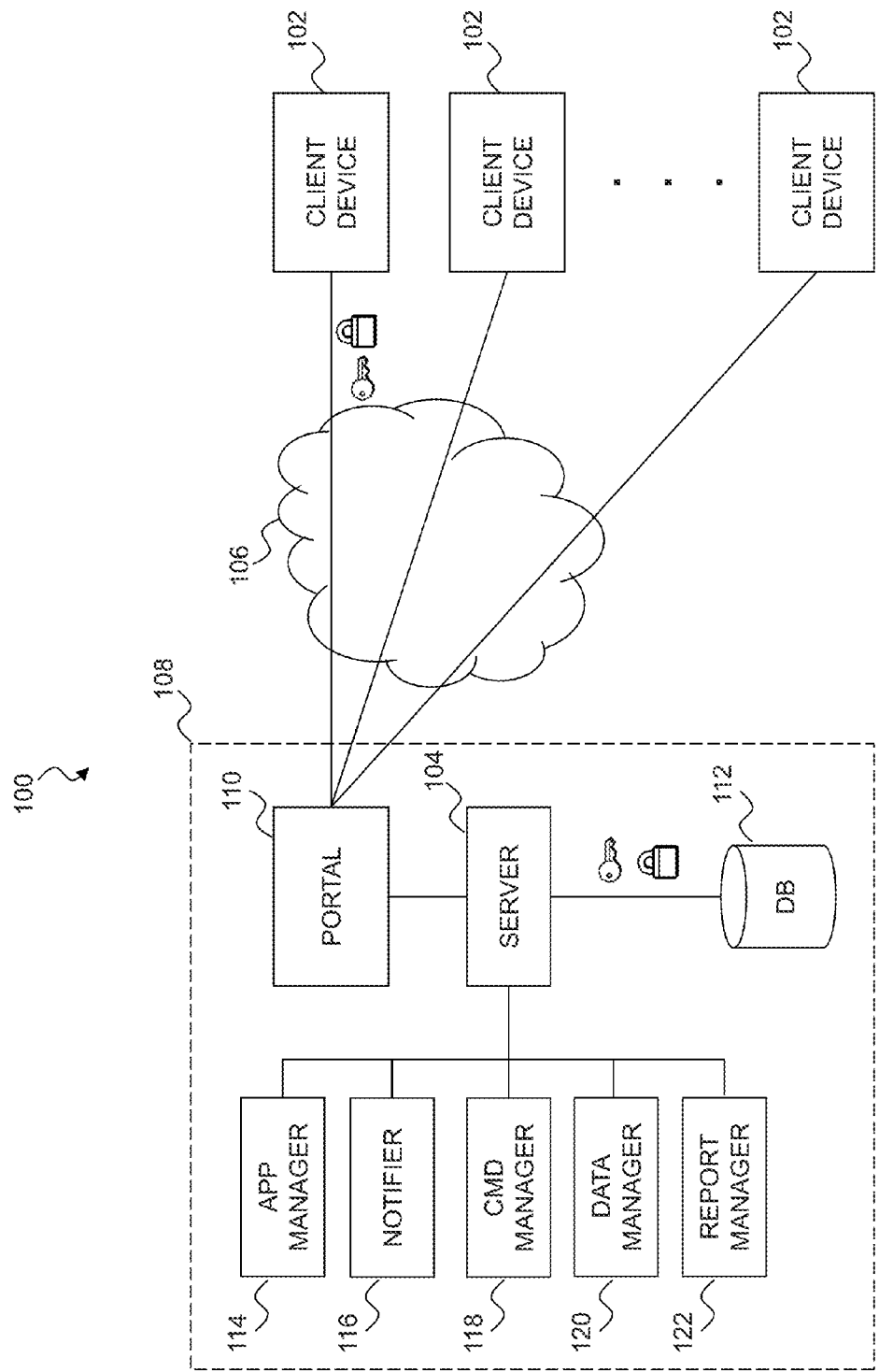
FIG. 1 illustrates a pictorial representation of one embodiment of a system in accordance with an embodiment of the present invention.

Referring now to the drawings, wherein like reference numbers are used herein to designate like elements throughout, the various views and embodiments of a method and system for wireless network optimization and remote control of mobile handset operation are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

In the following detailed description of the invention, reference is made to the accompanying drawings which form a part hereof, and in which is shown by way of illustration of specific embodiments in which the invention may be practiced. These embodiments are described in sufficient detail to enable those skilled in the art to practice the invention, and it is understood that other embodiments may be utilized and that logical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Referring now to FIG. 1, there is illustrated a system 100 for capturing, transferring, and processing the mobile handset operational activities in a dynamic fashion, as well as dynamically controlling the mobile handset from a remote location in the wireless network operated by the wireless network operator. System 100 includes a client device 102 connected to a cloud server 104 via a network 106. There may be any number of client devices 102 connected to server 104. Communications between the client devices 102 and the server 104 are encrypted. Communications from the client device 102 are transmitted through a firewall 108 and received by a portal 110. The server 104 has associated therewith a database 112 containing encrypted information. The server 104 further includes a plurality of applications such an app manager 114, a notifier 116, a CMD manager 118, a data manager 120, and a report manager 122.

The system 100 is one embodiment of a cellular wireless network disclosed herein, and more particularly, a system and method for capturing, transferring and processing the mobile handset operational activities in a dynamic fashion, as well as dynamically controlling the mobile handset from a remote location in the wireless network operated by the wireless network operator is illustrated. It is understood, however, that the following disclosure provides many different embodiments, or examples, for implementing different features of the invention. Specific examples of components and arrangements are described below to simplify the disclosed embodiments. These are, of course, merely examples and are not intended to be limiting.

According to one embodiment, the system includes the following components. 1) Client on Mobile Devices (phones), or otherwise referred to as IA Client: The client component runs in the background and may be activated through various triggers and mechanisms. The client's user interface (UI) may be invoked by triggers in the programming code and is not accessible to the consumer end user of the mobile handset. The client component receives commands from a central server, executes commands, and sends resulting data and reports back to the central server. The IA client may utilize its own Graphical User Interface ("GUI") which may be controlled by the user or the operator or the server. 2) Central Servers otherwise referred to as IA Server, or simply "the server," may communicate with IA clients on mobile devices in terms of establishing a connection, pushing commands or data to it, receiving data from it, and recording data to a database while performing pre-analysis and post-processing. 3) Reporting and Applications Servers which provide powerful reporting on data tables and geographic information system (GIS). The servers integrate multiple services and OSS/BSS to application server while providing access to its functionality through a web-based US to users and administrators.

According to one embodiment, the system also includes a Server Application. The Server Application may communicate with the Intelligent Agent (IA) Client on a smart phone, may send "command" to Client, and may receive data/information from Client. The server application has a basic user interface (UI) and is designed to reside on a web server. The server application may report data/information in table and GIS. The server application would basically provide the functions to:

a. register new devices having the Client Application by storing its pin, model info and other manufacture information;
b. manage devices registered with the system and monitor and view their status, manufacturer and other requested info;
c. send commands to devices including tasks to modify device data, refer feature lists for detailed info, interface to schedule these command and modification tasks for a device or multiple devices, users may select flexible commands on the server UI and may select devices with a different filter;
d. configure the scheduling and other client application activities like device status logging, message logging, command execution logging and reporting time intervals at server;
e. generating reports based on commands executed, data modified, device models, and/or operating system versions on a daily, weekly and monthly basis, as well as letting the user export these reports as CSV;
f. generating GIS reports based on data/information collected (Location and Signal Level), as well as letting the user export these reports as CSV;
g. reference Wi-Fi access point (AP) to Floor Mapping DB and show a height component;
h. provide a window that lets customer care issue advanced commands to debug everything using CLI in that window;
i. collect $3^{rd}$ party application version information from Client (phone), compare application version with master store (i.e. Android Application Store), and send command to Client for Application updates; and
j. ensure the security audit for accessing to web server, communication between Server and Client.

The network server is the central intelligent node of the IA end-to-end solution. It has many capabilities that control the end IA client on the handset. Its function however extends beyond that to offer new services and more control to the wireless service provider, as well parties outside the wireless operator, standardization committees and third party developers. In effect, the network server functionality layers may be expressed as follows:

Layer 1—Communication Link. This layer includes the communication link between the server and the IA client on the handset and defines the interface protocol to extract the IA uplink reports from the handset population.

Layer 2—Commands and Data. This layer covers the commands and IA uplink reports content exchanged between the IA server and IA client on the handset.

Layer 3—Intelligence. This layer includes a build on top of Layer 2 where a richer suite of commands and command groups are treated. This layer scope also covers services and tools such as Test Automation, Customer Care, Radio Frequency Measurements mapping, Bench marking, BI/Reports and more.

Layer 4—API. This layer employs the capability of offering the IA services to external organizations that may benefit from its functionality, and apply its capabilities to different domains.

Layer 5—External Applications. This layer covers the external world, writing more Applications that may run on the IA solution framework and hence expand the IA capability.

From the network side, the IA may be controlled remotely to perform additional tasks including: (1) Turning ON/OFF certain devices on the mobile handset such as Wi-Fi radio; (2) Perform remote test of certain software or any type of application on the handset; (3) Perform test automation and troubleshooting on any application, hardware or firmware entity running on the mobile handset; and (4) Initiate IA client activation on a per mobile device basis that are treated as specific targets. A different timer frequency may be associated with this to track the mobile location. The IA configuration may be different for target mobiles than normal mobiles, and may include different packages. This capability enables facilities to track the specific mobile handset exact location for different services and purposes such as: (i) operator/police wants to track a specific mobile number; (ii) identify the mobile location to the network operator when only the cell site is known and the phone location is not; (iii) lawfully, intercept and push the client to the open source mobile platform.

In addition, the IA network server offers another concept known as the Command Group Concept (CGC). CGC is a facility that resides on the IA network entity server, and may be used to combine commands for various usages such as regulatory, emergency, customer support, debugging, troubleshooting and many others such as call drop real-time analysis where the mobile user or test engineer uses the handset to call customer support and diagnose call drop issues in specific geographical areas. The CGC facility is different from the regular reporting in the sense that it has target specific commands and enables the IA to respond to these commands only, rather than generating a default report containing values of a pre-determined list of parameters. Note that CGC commands may be sent to specific mobile handsets, or collectively to multiple ones simultaneously.

The CGC utility commands include, but are not limited to, the following commands: (1) Get Location; (2) Get picture; (3) Get video; (4) Make a loud sound from phone; (5) Originate a 911 call; and (6) Originate call to specific predefined emergency family contact.

Each CGC command results in the corresponding action taken by the IA residing on the mobile handset to trigger the device and necessary accessories to perform the task required. For the CGC command "Get picture" for instance, the IA may interact with the handset camera device and snaps a picture, then IA may receive and forward the picture to the network entity that requested it. For "Originate a 911 call", the IA client may interact with the call initiation module on the handset and request it to initiate a call on behalf of the user to 911.

Other command groups are related to location. Such CGC commands include the following: (1) Get current location; (2) Turn on/off GPS; (3) Turn on/off Network Triangulation method; (4) Check distance from position 'X'; (5) Find closest service station for ATM, Gas Station, Hospital, Post Office; (6) Find direction of movement—used for navigation and tracking purposes; (7) Is Device Moving—used for tracking user; and (8) Is Device Stationary—used for tracking user.

Other command groups are related to CALEA. Relatively, the IA network entity may interface with the Law Enforcement Agency server, commonly known as CALEA Office, which implements court or government agencies orders that mandate the network owner and service provider to track and report all activates of a specific targeted user. The CALEA specifications and interfaces are standardized and are implemented in networks that are deployed and offer telecommunication services in the United States.

The CALEA related commands include, but are not limited to, the following: (1) Track Location periodically; (2) Record voice and send recording to LEA via OT-Server; (3) Copy texts and send to LEA via OT-Server; (4) Enable/Disable Tapping; and (5) Any or all of the location related CGC commands listed above.

The IA client may then perform the command as requested, and report the results back to the IA network server, which in turn feeds this information back to the CALEA Office server.

Furthermore, the following activities may also be performed at the network server: (1) applying a unique 3-D coverage mapping against reports received from the IA on mobile handsets. This provides the operator visibility for in-building coverage and status information and helps in macro cellular faults and diagnosis; (2) layer-1 signal quality comparison analysis among different mobile chip sets; (3) take thousands of readings related to different applications and modules that are running on the handset devices and use statistical methods to benchmark and rate modules and applications. This information may then be populated to the public or research institutes or any organization that may help improve the design and quality of operations of the application or module. This is applicable to all elements in the Benchmarking scope described in pervious sections; (4) Diagnose and identify lost mobiles that otherwise, without using the IA report information, the following would be performed: (i) Apply individual messaging and singularity tracking in the end-to-end network traffic to identify and track the mobile; (ii) Force disable un-authorized mobile; (iii) Apply harsh security measures; and (iv) Employ Law enforcement activity which has a long turn around and is not allowed to be used for network operator tracking purposes.

Also, the IA Server may make use of gathered information from the handsets related to the application service performance such as packet delay, packet loss, session setup delay, and associate those with the technology being used, location and time of day to generate a Quality of Service mapping against network technology (example Voice call over IP in IMS versus voice call in Circuit switched network), locations and time of day. This effectively defines the network performance at various levels and helps the network operator apply optimization exactly where it is needed.

In addition, the IA Server offers interfaces to existing servers in the wireless operator network to send and extract or receive information about the subscriber or services offered. Some of these servers include Billing Server, Performance Statistics Server, Alarms server, Logging server.

The IA Server may also connect to other servers and network entities deployed in the wireless operator network in order to be able to use certain services and send and connect to the IA Client residing on the mobile handset, or even communicate with the human user of the mobile handset. Such connections and services include but are not limited to: (1) Email server—the IA server may connect to the email server to send email notices to the user of the handset on behalf of the wireless network operator; (2) Short Message Server—the IA server may connect to the SMS Server to send and receive SMS messages to and from and to IA client as well to the handset in general as notification to the user on behalf the network operator; and (3) Multi-media Messaging Server (MMS).

In one embodiment, the client application resides on Android OS 2.1 or OS 2.2 platform. In addition the IA works on Android OS device models and OS versions. A mapping layer to Android APIs may also be integrated for ease in portability to other OS platforms.

In one embodiment, the IA is a background application with little to no user interface except for popup messages from the human user perspective. However, a user interface is available for administrative users. One example is a UI that shows the stored values in UE DB/Log to access the configuration information and changes that may impact the UE functions for RF measurements. UI is able to show that collection timestamp changes based on server commands, may also be able to show RF Measurements, LAT/LONG of last N readings that are in the UE DB/Log. It may also able to show RAW data to share how compact and efficient the storage is.

The IA may register the device after it is installed and launched the first time. The IA may be cleanly and completely uninstalled using standard techniques. The IA may be invoked periodically, at set time intervals which may be preset into the application by default and reconfigured from server, to send device reports, fetch command lists to be executed and other tasks expected of it or the IA may be invoked when prompted by the server. The timestamp may be recorded for measurement, configuration or other commands.

The IA may, periodically or after command from the server, list, install, or uninstall other third-party software and third-party applications, list all network settings including SMSC address, list or modify roaming lists. The IA may collect third-party applications versions, send version information to the server, and update third-party applications per command from server. The IA may also list Wi-Fi APs in close proximity to the mobile device.

The IA may periodically pull configuration updates from the server or upon command from the server. Alternatively, the server may also send the configuration updates to the IA periodically or upon need.

The IA may interact with the appropriate mobile handset existing devices and modules to measure RF signal levels and collect location information (Latitude/Longitude) periodically or upon command from the server and record the collected information on a database ("DB") on the device along with timestamp of measurement. The IA may also use event trigger for measurement, such as abnormal call drop, abnormal data link down, location update as roaming, handoff and others.

The IA may send a measurement report (DB of RF signal level and location, and other log) and device information (application utilization stats) to network server periodically or per command from server. Application utilization statistics may also be included in the reports, among other information as listed herein.

The IA may also collect and modify the mobile handset device configuration settings (including the default address book, calendar, default email configuration). The IA may also send a message, turn Wi-Fi or Bluetooth on and off, take a photograph, and upload a photograph to the cloud or a website per command from the server. This activity may be focused on specific problems as per customer care reports and perspective. Additional commands may easily be added to the IA scope and capabilities. In addition, useful facilities and tools may also be integrated in the IA to provide backup of configuration and other useful information, and then send those to a remote server for storage and safe keeping. Such information includes latest working system software configuration, address book, calendar, emails and more.

The following paragraphs provide a more detailed description of one embodiment of Intelligent Agent functions and capabilities disclosed herein. The Mobile Device Management (MOM) includes functions available on the IA Client installed on the mobile handset device and the IA Server deployed in the network. Note that 'Client' and 'IA Client' refer to the same entity, and such is true for 'Server and 'IA Server' terms.

Functions of the MDM on the client side on the mobile handset include, but are not limited to, the following: (1) Collect device status and operational information comprehensively and set configuration details—Report basic network and device status information, collect settings information for device features such as data link, Wi-Fi, email, PRL, collect operating statistics for operating system and applications, respond to server commands to alter or set configuration settings for operating system and applications, backup and restore key repositories of information such as address book, emails, calendar, and record status changes to the IA Server databases; (2) Update operating environment and firmware based on server commands—Distinguish OS, System Software, embedded applications, third-party applications, assess and report on compatibility between operating environment (including firmware revisions) and installed applications, update operating environment based on server commands, backup and restore firmware; (3) Software management—Allowing installation, de-installation and update of device application software including logging of activity and reporting of activity to server databases, activating/deactivating applications, collect and report software version information, and set or modify application configurations based on policies; and (4) Run Diagnostics and capture results or logs and send to server database—Periodic performance monitoring, periodic monitoring and disposition of specific events, collections/reporting error information, and alerting servers based on pre-set thresholds and conditions.

Functions of the MDM on the server side include, but are not limited to, the following: (1) Mobile Device Management—Send configuration data or commands to clients, manage device repository of device model, features and operating environment, compare firmware and software version with predefined master images, send update commands to client, and initiate diagnostics on client for trouble shooting; and (2) Customer Care—Integrate customer tickets with MDM for trouble shooting, report historical data and statistics for better customer support.

RF Measurement entity includes functions available on the IA client as well as the Server side. Functions of the RF Measurement entity on the client side include, but are not limited to, the following: (1) 2G, 3G, or 4G RF Measurement—Measure RF signal and record GPS location or network location periodically or based on server commands, measure RF signal of neighboring cells, record MNC+MCC, LAC Cell ID, Network type, timestamps, and accumulate and upload measurements data to server; (2) Call Events Measurement—Measure RF signal and record location based on triggering events, i.e. voice call failure, data link down, handover and roaming, record specific call, call duration, call terminal code based on server triggers, record data usage of applications and connection/session information, upload measurements; (3) Wi-Fi or DAS Measurement—Measure Wi-Fi signal and record Wi-Fi access point ID, record all Wi-Fi AP ID with signal threshold, record Wi-Fi-based location and timestamp, measure and record RF signal, unit ID and location of DAS; and (4) LTE RF Measurement—Measure LTE Channel Spectrum (Channel Power, Adjacent Channel Power) and record GPS or network location, record Cell ID, Sector ID, Group ID from Sync Signal, measure and record average DL throughput, and provide support LTE dongles.

Functions of the RF Measurement entity on the server side include, but are not limited to, the following: (1) RF Reporting—Display Signal coverage on GIS, report Signal to database based on different filter criteria, trigger RF measurement to a batch of mobile devices based on different filter criteria, analyze roaming and handover statistics; and (2) Support for RF Optimization—Improve coverage based on measurement, adjust roaming and handover based on roaming analysis, and integrate measurement results to existed NPO tools.

Testing and Benchmarking entity include functions available on the IA client as well as the IA server. Functions of the Testing and Benchmarking entity on the client side include, but are not limited to, the following: (1) Run testing and report log to the server; (2) Collect Benchmark on CPU, memory, I/O, battery, graphics and other entities; (3) Basic functional test and supplement services test; and (4) Inter-operation test with live networks.

Functions of the Testing and Benchmarking entity on the server side include, but are not limited to, the following: (1) Test Automation Services—Develop automated test scripts, manage test process, schedule test and trigger test, collect test results from client, store test results to DB, analyze and report test results per different OEMs, OS or Platforms, functions, and benchmarking according to test result; and (2) Integrate Third-party Test automation tools—Interface with "TestQuest Countdown" tool, run test scripts designed by TestQuest.

The IA system described herein offers Intelligent method to measure signal strength by controlling the IA on the mobile handsets from a central node in the network regardless of the radio technology and mobile handset type used such as CDMA, GSM, GPRS, EDGE, UMTS, HSPA+, LTE and Advanced-LTE and more. The method and collected data may be used for many purposes, including but not limited to: (1) Display Signal coverage across the measured geography; (2) Identify the areas where the signal conditions are causing abnormal events; (3) Identify the areas where operators are experiencing roaming; and (4) Identify area where phones are oscillating between access technologies.

The IA system may significantly reduce the costs related to Radio Network Planning, Design and Optimization. It may improve coverage in areas thereby reducing roaming costs. This information when mapped with Device Types may enable the Device manufacturers to fine tune their devices for better performance. Given the richness of data collected, a myriad of very powerful Analytics for Mobile Industry are available. Since the collection of information is controlled through a central node, the remote centralization lends itself to changing the collection process with ease.

According to one embodiment, the IA system is designed as a singular platform for multiple uses through APIs and extensibility features. Important features of the IA system include, but are not limited to, the following: (1) A Robust Transport Layer capable of data exchange via standard protocols such as IP and Mobile IP, seamless communication among mobile devices, central servers and reporting and application servers, and built-in security audit for access between servers and clients; (2) Push/Pull communications between central servers and mobile client including server invoked SMS to trigger client for further actions, client initiated mobile IP connection to Central Servers via GPRS/PDN/Wi-Fi; (3) Command invocation and management to support all applications including complex command sets sent to the client, client session controller to decode and assign/queue commands list to appropriate applications, and periodic client timers which may be predefined and remotely modified. Also the whole platform may be offered as a Platform for others to build new applications. Applications Programming Interface to IA Server may be provided to interact with IA Clients. Thereby enabling another set of usages.

The measurements and information, typically time stamped when collected, included in the report created by the IA residing on the mobile handset may include, but not be limited to, the following:

Timestamp—this includes the current time in universal time clock including hour, minutes, seconds, and milliseconds. It also includes date including day, month and year. The format may be of any type that is understandable by human or machine.

Location—this includes: (1) Longitude; (2) Latitude; (3) Elevation.

Radio Cell Information—this includes: (1) Wireless cell Identification (covering any radio type GSM, CDMA etc.); (2) Wi-Fi spot identification; (3) LTE radio cell identification; (4) WiMax cell identification; (5) Radio technology being used; and (6) Any other radio cell site identification.

RF measurements—this includes Radio frequency reading levels and signal strength detected as per the mobile device RF detection modules and algorithms.

The technology to which the RF measurement applies covers at least the following: GSM, UMTS, CDMA, LTE, WiMax.

The RF measurements calculation and collection may be triggered by the IA by the following events: (1) Periodically—The periodicity may be configured and changed dynamically on the mobile handset by accessing the IA interface at the handset directly or remotely from a network entity over an IP connection; (2) Upon an occurrence of one of the following events: Handoff, Roaming, Breathing, or any other event identified in the cellular protocol. For example, mobile registration, handset power-up, handset power-down, mobile originated voice call, mobile originated data session, mobile terminated voice call and many more. For each of the events, an associated RF measurement may be recorded upon the event occurrence. This association may also be included in the report to facilitate post-processing of the report in the network; and (3) Network requested—This method is initiated by the network where a network entity may communicate with the IA on the mobile device and request an immediate RF measurement report, in which case, a complete or partial IA uplink report is generated and sent to the network entity that requested it.

Application information—this information is related to the applications that are running on the mobile device. These include applications that were provided with the handset and service offered by the wireless service provider, as well as third party applications that are downloaded and installed without the service provider knowledge. Some of the applications and services offered by the wireless service provider with the handset include but not limited to: Voice, Short Message Service (SMS), Multimedia Messaging Service (MMS), Email, Voice over IP (VoIP), Voice over LTE (VoLTE), Address Book, Voice Mail, Visual Voice Mail, Calendar, and Others. Some of the third party applications and services installed by the user on the handset are but not limited to: Skype, Gaming, Timer Clock, FindMe, Instant Messaging, and Others.

The information that the IA client may collect regarding these applications running on the mobile handset may include but are not limited to: (1) List of the applications installed including time of install, time of un-install, date of first time use; (2) Performance information of each application including utilization rate, crash frequency, memory occupancy usage, CPU usage, time and date of usage with handset location and type of radio access (Wi-Fi, LTE, circuit switch data) at the time of usage, and others; and (3) Service performance per application. This is used to capture the quality of service of the specific application. The information is captured and tagged with the application being used as well as the radio technology being used example Wi-Fi, LTE etc. The measurement statistics captured are Minimum, Maximum and Average values during the time window of reporting the Uplink IA report. The values are reset to zero at the start of every reporting period. The service performance elements include but not limited to: (i) Session setup delay—applicable to voice call, VoIP, video call, and any application that requires a session setup. Protocols include SIP, HTTP, Circuit switched call sessions such as voice call over GSM, CDMA and others; (ii) Jitter—applies to any realtime application running over IP such as VoIP, Video call and other; (iii) Message delivery delay—this captures the time it took to receive confirmation that a message sent by the mobile has been delivered. This applies to applications such as Short Message Service (SMS) and Multimedia Messaging Service (MMS), or any other messaging application such as Instant Messaging (IM); (iv) Packet loss—this covers the number of packets lost or missing from a packet stream of an application running over IP such as VoIP or video call, video streaming. It may also be calculated as a ratio for the current session i.e. % of packets not received out of the total packets received during the measuring window; and (v) In-Session request delay—this includes the delay for a request to be completed as part of another session in progress.

Benchmarking Information—this covers information on the performance of the devices, applications and modules running on the mobile handset. IA may have the proper internal interfaces to necessary items and modules on the mobile device to allow it to monitor and capture performance data and other information about each device. The items and devices may cover but are not limited to: (1) Hardware—Camera, Chipsets, Battery, CPU, GPU, Memory, Codec Chips, and others; (2) Firmware—Layer 1/2/3 Protocol stacks, Codecs for audio data, Codecs for video data, and others; (3) Operating System—This includes but not limited to: Android, Brew, IOS, QIX, Symbian, and others; (4) Application—Navigation, Weather, Facebook, Skype, and others.

The IA report may be sent to the network entity in one of the following fashions: (1) Pushed periodically; (2) Pulled by the network periodically; (3) Pulled by the network upon request from a network operator agent. The repot content may be sent: (1) All at once where the complete report is generated every time it is sent; or (2) With Incremental delta where only the changes from the previous report are sent.

The transfer protocol used to send the IA report to the network may be: (1) FTP, SFTP or other over an IP data session over the public internet; (2) SMS over IP using SMPP protocol; or (3) SMS over legacy wireless using legacy SMS protocol. Regarding using SMS as the transport protocol, SMS is currently used today to exchange personal messages among mobile consumers, one message at a time. It is also used today as a background notification system (i.e. invisible to the human user of the mobile device) to send application notification between a server in the network, and the mobile handset. Such example includes sending a notification from the network to the mobile handset indicating that a voice mail has stored in the Voicemail server of that user. When the SMS with the VM notification is received at the mobile, the SMS application residing on that mobile handset translates the messages into an internal event that activates a display icon on the mobile screen and possible plays a tone to the human user hence indicating to the user the presence of a voicemail.

In one embodiment, the IA system may utilize the SMS in a different way where a detailed report containing statistical information is sent in one or multiple messages from the mobile towards a server in the network which then presents the content as is for post-processing and analysis by a third party entity. In other terms, SMS is being used here as a file transfer protocol between the mobile handset and a server, all happening in the background without the knowledge of the end consumer user.

If the mobile handset is connected to the public internet over an IP-data connection: (1) IA may use a pre-configure IP address (stored on the local memory of the mobile handset) of the network entity to establish a communication session over the IP data connection. Once established the network entity is now aware of the mobile IP address and may initiate an IA report request with that mobile; (2) Instead of the IP address, the network entity URL may also be pre-configured on the mobile handset. In that case, the network entity server IP address may be discovered by the IA via DNS URL resolution query.

If the mobile handset is not connected to the public internet: (1) The network server does not have visibility and awareness of the mobile handset status in terms of whether the IA is up and running or not; (2) The network may then initiate a network-initiated-SMS message and send it to the mobile number associated with the mobile client in question. The SMS is sent to the mobile in the standard way as it is done today in the cellular network. However, the SMS message may be sent in the background and transparently to the human user knowledge. The content of the SMS message may only be understandable by the IA module. Once the mobile handset receives the SMS, and after decoding the message body, it transfers it to the IA which decodes the content and interprets it to generate an IA report and send it to the network, again via SMS messaging. If the information to be transmitted to the network do not fit in a single SMS message according to the SMS policies and protocol rules, this scenario covering the complete report or an increment of the report as described earlier, the report is split across multiple SMS messages and sent up individually to the network server entity which in turn may apply concatenation processing to create a single report. The network server entity address and destination information for SMS transfer is pre-configured on the handset and accessible by the IA module; (3) SMS protocol may also be used to send the IA report periodically by the mobile handset and without being triggered by the network. The same concept as described above may be used to locate the destination address of the network server and the report transfer process.

According to one embodiment, reports created are stored on the mobile handset local memory and sent periodically. An internal clean-up algorithm is also available to delete the reports from the mobile handset memory once they are transmitted to the network server entity. Multiple reports may be sent at once or individually to the network entity. The IA report may be sent to the network in any format including but not limited to the following: Text. Comas separated vectors, Binary, and Others.

Figure 2:
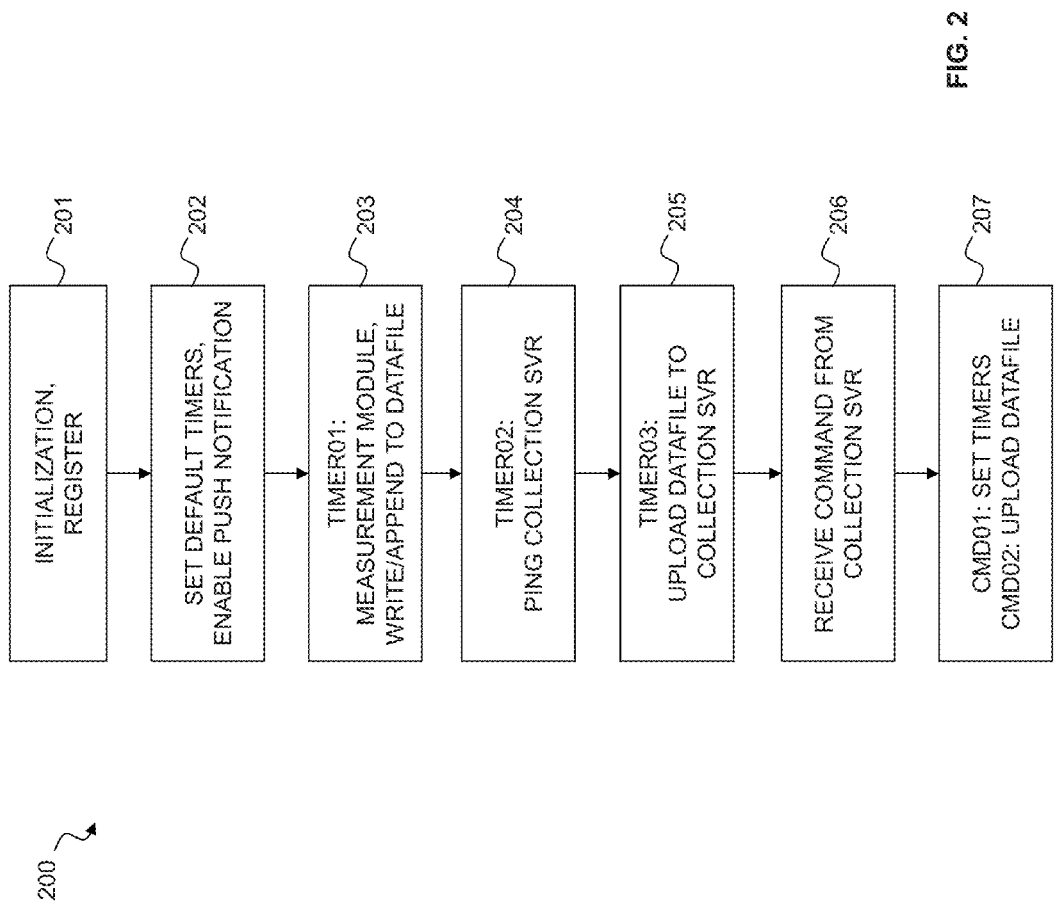
FIG. 2 illustrates a flowchart of an exemplary method in accordance with an embodiment of the present invention.
Figure 3:
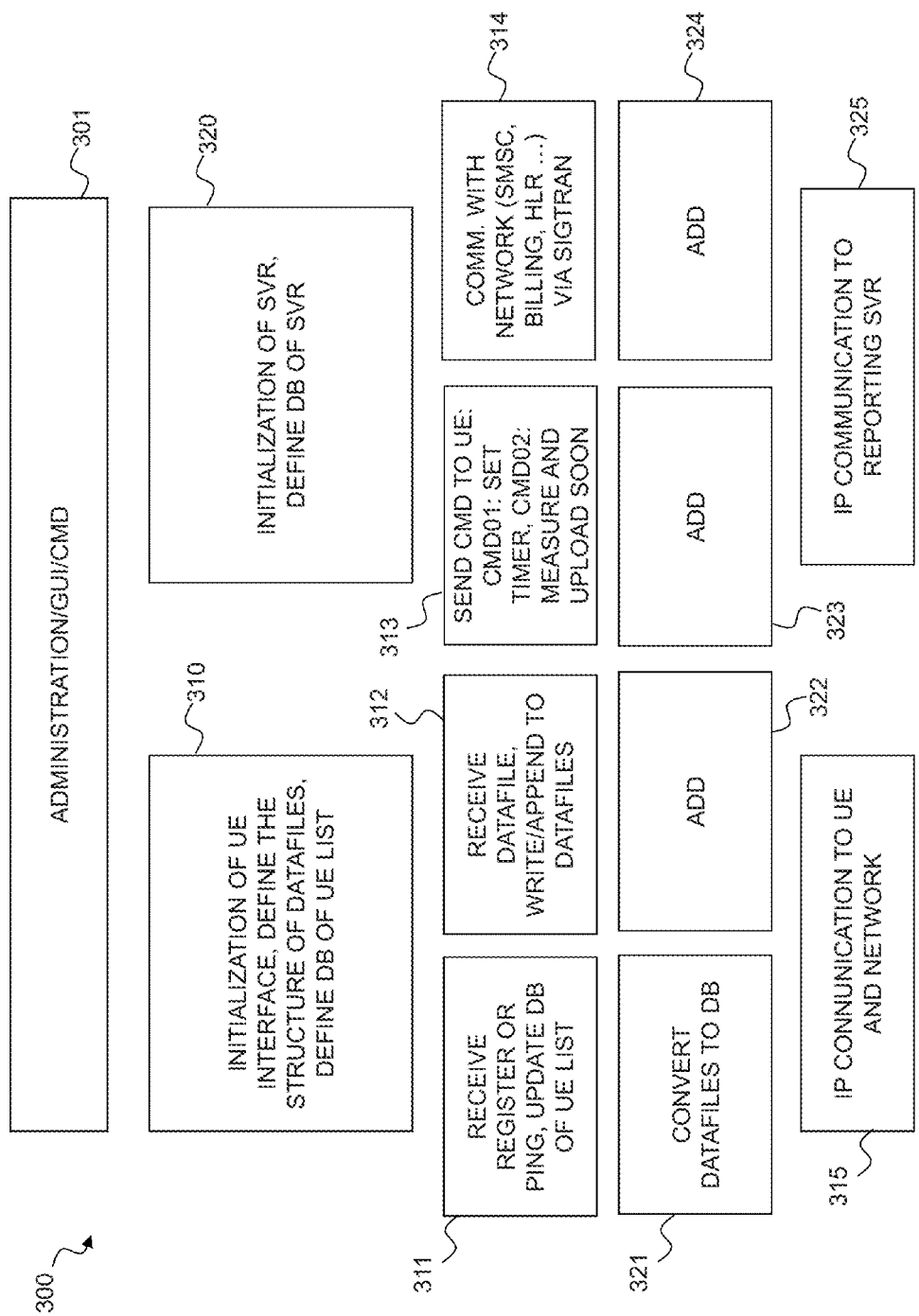
FIG. 3 illustrates a diagram of an exemplary system and method in accordance with an embodiment of the present invention.

Referring to FIGS. 2 and 3, a flowchart and a diagram illustrating an exemplary system and method in accordance with an illustrative embodiment of the invention is provided. The figures provide a brief description of the logical flow for the IA Initialization, registration and data file upload. Note that a numbering scheme is utilized in the figures to refer to different modules within the algorithm. This is merely for ease of reference while describing the solution and corresponding text.

UE Module 200, also called DE Client, is pre-programmed for an Android Phone (Android device) and may run in background. Modules (201-207) are triggered periodically or upon command from Collection Server ("SVR"). Modules 200-207 may be executed in sequence or in any order.

201 Initialization and register—Initialize UE module in device (Android Phone or device); Initialize parameters: device type, own subscriber number, IP address of Collection SVR (pre-programmed), Timers, other UE variants related to device type, datafile direction/structure; Define Timer01 (default 300 seconds) as measurement period; Define Timer02 (default 1 hour) as Ping Collection SVR period; Define Timer03 (default 24 hours) as upload datafile period. Register the device to Collection SVR via Mobile Internet. Mobile Internet means Wi-Fi or Packet Switched Domain of GSM/UMTS/CDMA/LTE. Device may select Wi-Fi first if Wi-Fi is available. Device may select Packet Switched Domain if Wi-Fi is unavailable. Own subscriber number and device type may be sent to Collection SVR for register. Collection SVR 311 receives register information and record "subscriber number, IP address of device, device type" to DB of UE list. SVR 311 may send response (successful register) to UE. Subscriber number is static key index in DB of UE list. IP address of device is dynamic, which is used as Internet connection. IP address of device may be updated in module 204 if device is roaming to new network. Use Register function only in first time on one UE. After successful register, module 204 Ping may be called when opening UE Client.

Module 202 Set default Timers, Enable push notification—Set Timers, enable Timers. Enable push notification, so that UE Client may receive "notification" in Timer Trigger or any command from Collection SVR (via Mobile Internet) even if UE Client is running background.

Module 203 Timer01: Measurement Module, write/append new measurement to datafile; Define contents of measurement, smart algorithms, format of datafile. The coding of this module 203 may depend on device type, network technology (GSM/CDMA) and OS.

Module 204 Timer02: Ping Collection SVR—In Register 201, UE Client sends "subscriber number, device type" to Collection SVR via Mobile Internet. IP address of UE is recorded in DB of UE list on Collection SVR. Collection SVR may find UE in Mobile Internet by using "IP address of UE". If IP address of UE is changed due to roaming of UE, e.g. from GSM to Wi-Fi, or from GSM to LTE, or geographic change, Collection SVR cannot find UE if IP address of UE is not updated in SVR. Module 204 may Ping Collection SVR in Timer02 period, "subscriber number, IP address of UE" pair is sent to Collection SVR for updating. Default Timer02 is 1 hour. Assuming IP address of UE is changed but not updated to Collection SVR within 1 hour (Timer02), Collection SVR 313 sends command to UE exactly in this interval, obviously, Collection SVR can't receive response from UE due to IP address changing. In this case, Collection SVR may record the command in buffer. Once UE pings Collection SVR and updates new IP address to SVR, SVR 313 may send command in buffer to UE again. Alternative of module 204: once IP address of UE is changed, UE pings collection SVR to update the new IP address, Timer02 is not needed.

Module 205 Timer03: Upload data file to Collection SVR. Module 205 is triggered by Timer03 or CMD02. Send datafile to Collection SVR via Mobile Internet. Receive successful response from SVR. Dump local datafile. If 205 receives failure response from SVR or does not receive any response from SVR, 205 may re-send data file in a set period of time, such as 5 or 10 minutes, and try multiple times such as 3 times.

Module 206 Receive command from Collection SVR-"Enable push notification" in 201 initialization phase let 206 to receive message even if UE client is in background status. As explained in 204, if IP address of UE is changed and doesn't inform SVR, SVR can't send command to UE and buffer it on SVR. Module 204 Ping SVR may update new IP address to SVR and trigger SVR 313 to send command in buffer to UE. Module 206 sends response to SVR when receiving command. Trigger 207.

Module 207 CMD01: Set Timers, CMD02: Upload datafile. CMD01: call 202 Set Timers with new parameters from SVR. CMD02: call 203 Measurement, call 205 upload datafile to SVR.

According to one embodiment, Collection SVR Module 300 may reside in one server including, but not limited to, one Linux server. Modules (310-315) are designed for communication to UE client and writing measurement to datafiles. One Collection SVR may handle 1 million UEs. Modules (320-325) are designed for DB management and communication to Reporting SVRs.

Module 310 Initial UE interface modules, Define the structure of data files, Define DB of UE list—initial UE interface modules on Collection SVR. Define default Timer01, Timer02, Timer03 for UE Client, same value as UE. Define the structure of datafiles. Solution 1: define one datafile on SVR for one UE, use "subscriber number" as file name. Append new measurement to local datafile on SVR. Define DB of UE list: subscriber number as static index, IP address of UE, device type, Network technology (GSM/UMTS/CDMA/LTE/Wi-Fi/DAS), flag of command in buffer, Define other parameters.

Module 311 Receive Register or Ping from UEs, update DB of UE list. Receive register from UE, Add new record to DB of UE list, Create new datafile for UE, Send "successful" response to UE, Receive Ping from UE, Find right record in DB of UE list by using subscriber number, Update IP address and network technology of this record, Send successful response to UE. Check "flag of command in buffer" of this record, if flag=TRUE, trigger 313 to send command again to UE.

Module 312 Receive data file from UEs, write or append it to data files; Receive data file from UE, lock data file on SVR, append new information to data file, unlock data file on SVR. Send successful response to UE. Worm module 321 that one datafile on SVR is updated.

Module 313 Send command to UE—triggered by 301 Administration, graphical user interface ("GUI"), or command ("CMD"). Operator may select one UE or several UEs via GUI. The input to GUI may be subscriber number or subscriber range, may be devices on one geographic zone (interface from Reporting SVR to Collection SVR). Module 301 may convert all inputs to subscriber numbers. Module 301 may call 313 with parameter "subscriber number(s)", "CMD01 or CMD02". CMD01: Set Timers for one UE (subscriber number)—Get IP address of UE from DB of UE list, Send CMD01 with new Timers to IP address, Check response from UE. CMD01: Set Timers for batch of UEs (subscriber numbers)—Call "CMD01: Set Timers for one UE" one by one. CMD02: collect datafile for one UE (subscriber number)—Get IP address of UE from DB of UE list, Send CMD02 to IP address, Check response from UE. CMD02: collect datafile for batch of UEs (subscriber numbers)—Call "CMD02: collect datafile for one UE" one by one. Common process: Check response from UE; If no response from UE, record the command to buffer (or another DB), set "flag of command in buffer" to TRUE; If receive successful response from UE, set "flag" to False, remove the command from buffer (or another DB).

Module 314 Communication with Network—the purpose of communication with Mobile Core Network is to verify the subscriber number with HLR and Device and set free package of 100 MByte (configurable) per month for this subscriber number. Register process: UE client side ← → SVR side, UE sends register to SVR via Mobile Internet with "subscriber number"; SVR sends signaling to HLR to get profile of subscriber number; SVR sends SMS with one register CODE to UE through SMSC; UE receives one SMS with CODE; User enters CODE in GUI of UE Client, presses "verify" button in GUI; UE Client sends CODE to SVR for verification; SVR receives CODE and do double check, verification OK; SVR sends signaling to Billing component to add free data package of 100 MByte(configurable) per month for the subscriber number. Prepaid and Postpaid may have different signaling scenario. SVR records information to DB of UE list as 311 register.

Module 315 IP communication to UEs and Network—Collection SVR may have one static IP address. This IP address may be pre-programmed to UE Client, so UE Client may communicate with Collection SVR via Internet (Packet Switched Domain or Wi-Fi). Collection SVR may need another IP address for Sigtran configuration, which is used to communicate with Mobile Core Network (Circuit Switched Domain). One static IP address may be used for Sigtran too, but bandwidth may not enough.

Figure 4:
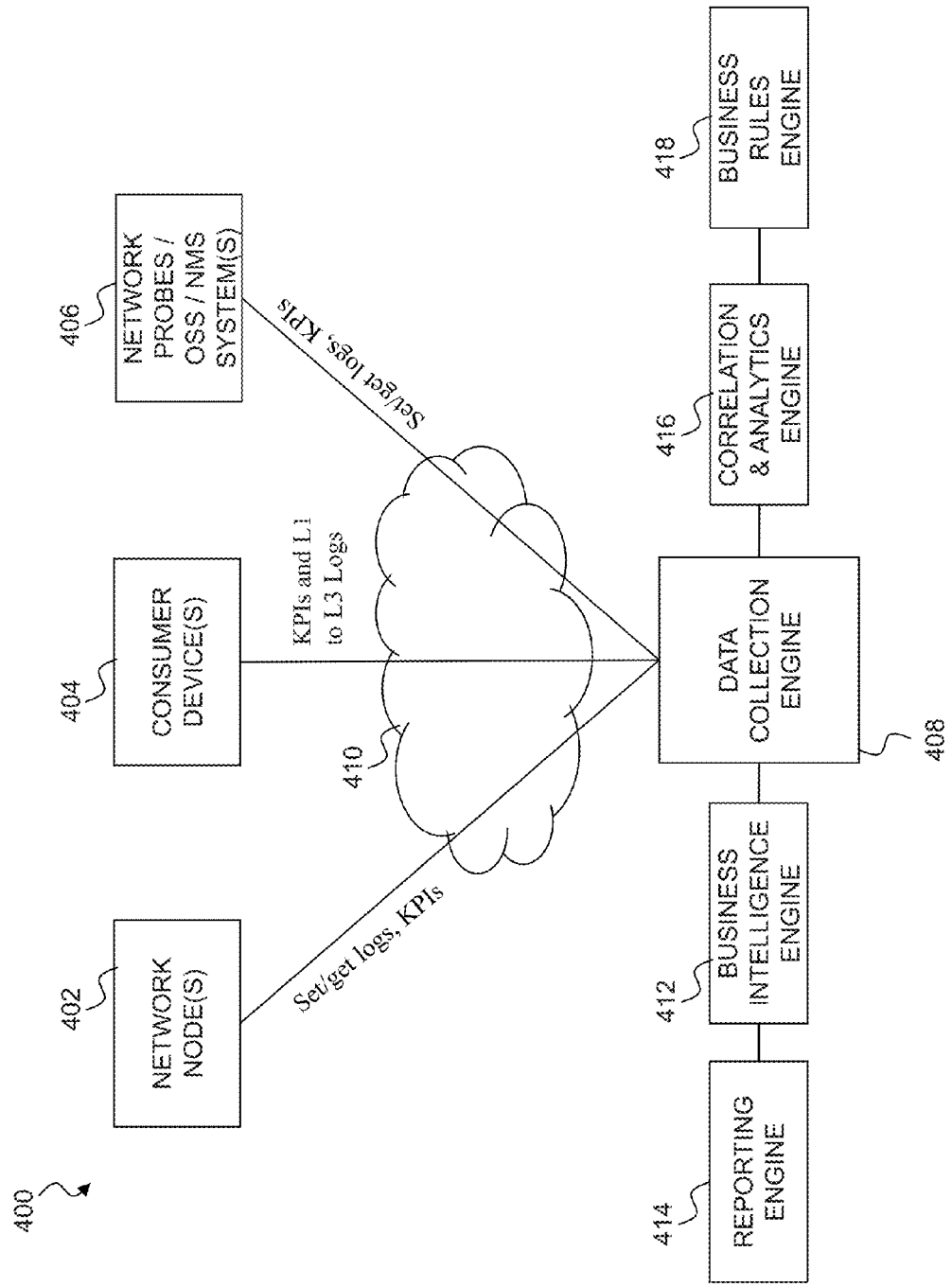
FIG. 4 illustrates one embodiment of a network level correlation and troubleshooting system.

Referring now to FIG. 4, there is illustrated a network level correlation and troubleshooting system 400. The system 400 includes a network node(s) 402, a consumer device(s) 404, and a network probes/OSS/NMS system(s) 406 connected to a data collection engine 408 over a network 410. The network node(s) 402 may be cellular or WiFi such as AP, eNodeB, S/P-GW, MME, etc. The consumer device(s) 404 may be smartphones, tablets, phablets, PCs, MAC, etc. The data collection engine 408 is part of the server 104. The data collection engine 408 includes a business intelligence engine 412, a reporting engine 414, a correlation and analytics engine 416, and a business rules engine 418. The system 400 can automate tests and KPI capture from layer 3 of the devices. The business rules engine 418 compares KPIs with threshold values to determine pass/fail results. An admin GUI can be used to change thresholds, create additional tests, etc.

Referring now to FIG. 5, there is illustrated a layer decoding system 500. The system 500 includes at least one client device 502 (1-n devices) running an application client and acting as layer 3 modules. The at least one client device 502 is connected to a server 504 over a network 506. The server 504 includes an L3 decode module 508. The L3 decode module 508 remotely captures L1 to L3 logs on the at least one client device 502 and performs real time decoding of L1 to L3 logs. Device debugging uses layers 1 to 7. Decoding includes LTE, RRC, and NAS layers, and allows for decoding sessions or individual decode commands. Additionally, post processing may be performed, integrated with QXDM and Actix, a built-in correlation engine for integration with network elements, and advanced analytics for special use cases such as SRVCC scenarios.

The platform allows for mobile performance assurance. The IA may function with any smart device, such as a mobile phone. The IA may be divided into multiple parts. In one embodiment, the IA is divided between an IA Client for the smart device and the IA Server for the operator. The user elects to install the IA Client. The IA Client is installed over the air (OTA) with minimal interaction from the user. The IA Client may be installed over many different devices and many different types without interaction from the user or operator. The IA Client is scalable and network and device agnostic. Networks and devices include, but are not limited to, the following: LTE, WiFi, 3G, GSM, Android, Windows Mobile, iOS, and Linux. Once installed, the IA Client registers with the IA server. No user interaction is required as this step and the remaining steps may occur automatically. The IA Client tasks are scheduled by the IA Server. The smart device automatically retrieves and processes the tasks through the IA Client. The smart device may be manipulated or controlled by the IA Client and/or IA Server. Applications and functionality already present on the smart device may be engaged and executed without the interaction from the user. Data is collected from the smart device by the IA Client and transmitted to the IA Server. The IA Server stores the data, performs analytics on the data, and transforms the data received into actionable business intelligence through visualization, analysis, troubleshooting, and optimization. Smart kits and smart probes may also be implemented with the system and method of FIG. 4 as described herein. IA client software may be loaded and executed on many electronic devices, including but not limited to, phones, computers, tablets, mobile phones, smart phones, cameras, smoke detectors, alarm systems, sensors, wearables, IoT devices, home appliances, televisions, set top boxes, and any other electronic equipment. IA client software may also run on network elements, enterprise app servers, and most computers. Additionally, the IA Client may control or interact with other IA clients. In this instance, the IA client is a state machine.

The system disclosed herein allows for one cloud-based mobile platform to perform multiple applications. For instance, the platform can perform actions on mobile devices or network elements in any cellular or WiFi network to enhance customer experience by measuring, analyzing and reporting metrics related to service, network equipment, devices, and applications. The platform is flexible because it can be used over various network types such as WiFi, GSM, 3G, and LTE networks, and is compatible with many devices, including Android, Windows Mobile, iOS, and Linux. Analyzing devices and equipment on the network provides reporting, protocol decoding, big-data, voice, video, cell planning, ETL, and business rules. The platform further provides data on E2E load, CSFB benchmarking, low cost drive testing, LTE/WiFi voice quality, Native L1 to L3, LTE data performance, E2E small cell testing, benchmarking, maintenance window automation, small cell E2E load, network monitoring, DAS performance, VoLTE/VoWiFi Performance, video quality, and device field tests.

The platform may be used for network analytics, including customer experience MOS for voice and video, network performance, quality and benchmarking, network troubleshooting, operations automation and maintenance window automation, large event management, drive testing, site shakedown testing, customer care for network and devices, small cell planning and testing, and application for VoLTE, VoWiFi, IRAT, SRVCC. The platform may also be used for device hardware, including test automation, reverse logistics, diagnosis, FUT and voice MOS for VoLTE and VoWiFi, benchmarking, and IoT and accessories testing. The platform may additionally be used for device software, including measuring app impact on the device and the network, application usage, application behavior, and application performance management.

Test automation may include advisory services (ROI analysis, feasibility studies, stability analysis, automation maturity assessment), automation frameworks (tool agnostic framework, custom frameworks (client based) industry solutions, point solutions), tool evaluation and recommendations (open source vs. commercial, license modeling and utilization, maintenance and recurring overheads, tool comparison matrix, and training and skills assessment), and test script development/maintenance (test script development and proofing, build verification suite, regression pack development, continuous integration, and lean maintenance).

The platform allows for multiple uses with RANs (macro, IDAS, ODAS, small cells), such as LTE, 3G and WiFi, including automated low cost drive and walk testing (reduced costs, improved quality), cell site shakedown automation (quicker deployment, lower costs), small cell planning (quicker deployment, cost savings), maintenance window test automation (revenue assurance, quality, efficiency), large event monitoring and optimization (quality, CEM, deployment), monitoring and troubleshooting of IDAS, ODAS, RAN (improve quality and efficiency), E2E load generation for IDAS, ODAS, small cells (quality improvement acceptance testing), QoS and QoE automation (CEM, quality, benchmarking, trending), and advanced troubleshooting and diagnostics (E2E troubleshooting quality).

The platform may also be used for WiFi networks and WiFi devices, including customer experience management (large events, stadiums, enterprises), performance, benchmarking, and monitoring (WiFi networks in enterprises, cities, streets), automation of voice over WiFi and handovers to 4G and 3G, voice quality testing of VoWiFi (MOS/PESQ/POLQA), video quality testing (MOS/PESQ), automation of regression, sanity, and load testing, automation of WiFi device IoT and certification, and automation of alpha and beta testing.

The platform may also be used for various business and operations support systems, including charging plans and services benchmarking (marketing, CEM), E2E billing and charging test automation (revenue assurance), E2E conflict testing automation (quality, revenue assurance), maintenance window test automation (revenue assurance, quality, efficiency), field test automation (reduce costs and improve quality and coverage), lab regression and sanity test automation (improve efficiency), trend analysis (quality, CEM, etc.), E2E load generation (improve quality), and advanced diagnostics BSS integration (E2E troubleshooting, revenue assurance).

Figure 6A:
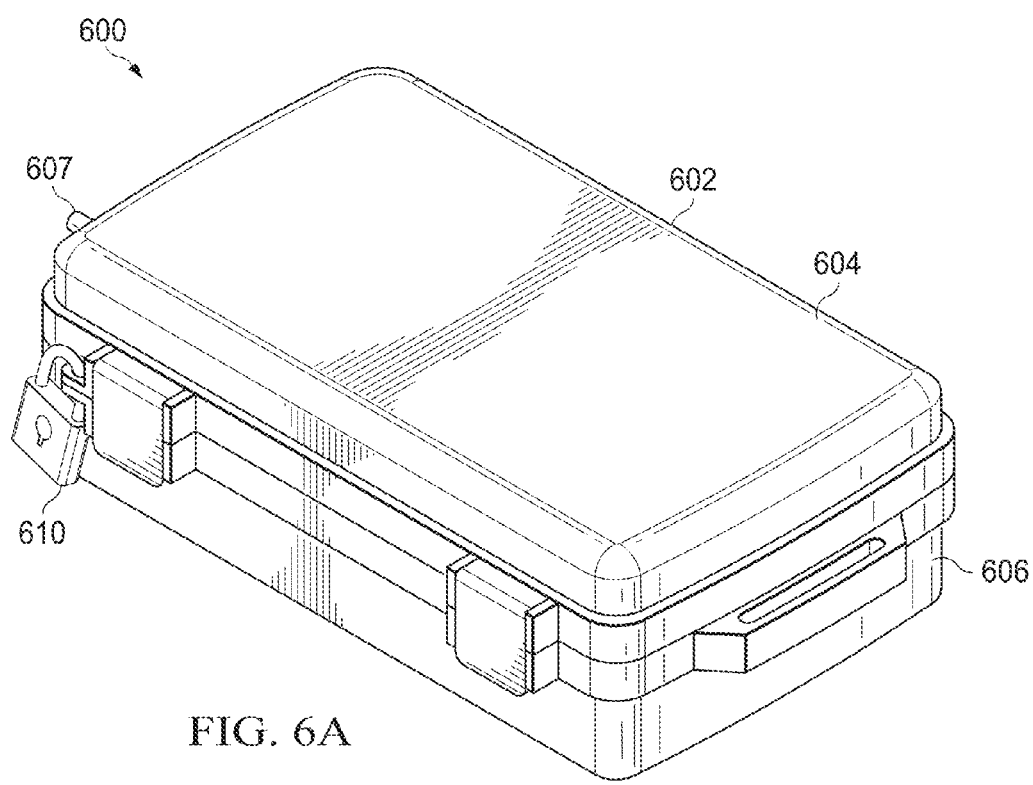
FIG. 6A illustrates a perspective view of one embodiment of a SmartKIT device in a close state.

Referring now to FIG. 6A, there is illustrated a perspective view of a SmartKIT device 600 in a closed state. The SmartKIT 600 includes a casing 602. The casing 602 may be made out of a durable material such as a hard plastic, or any other appropriate material. The casing is divided into an upper portion 604 and a lower portion 606. The SmartKIT 600 also includes an external GPS device and antenna 607, as well as an external lock 610.

Figure 6B:
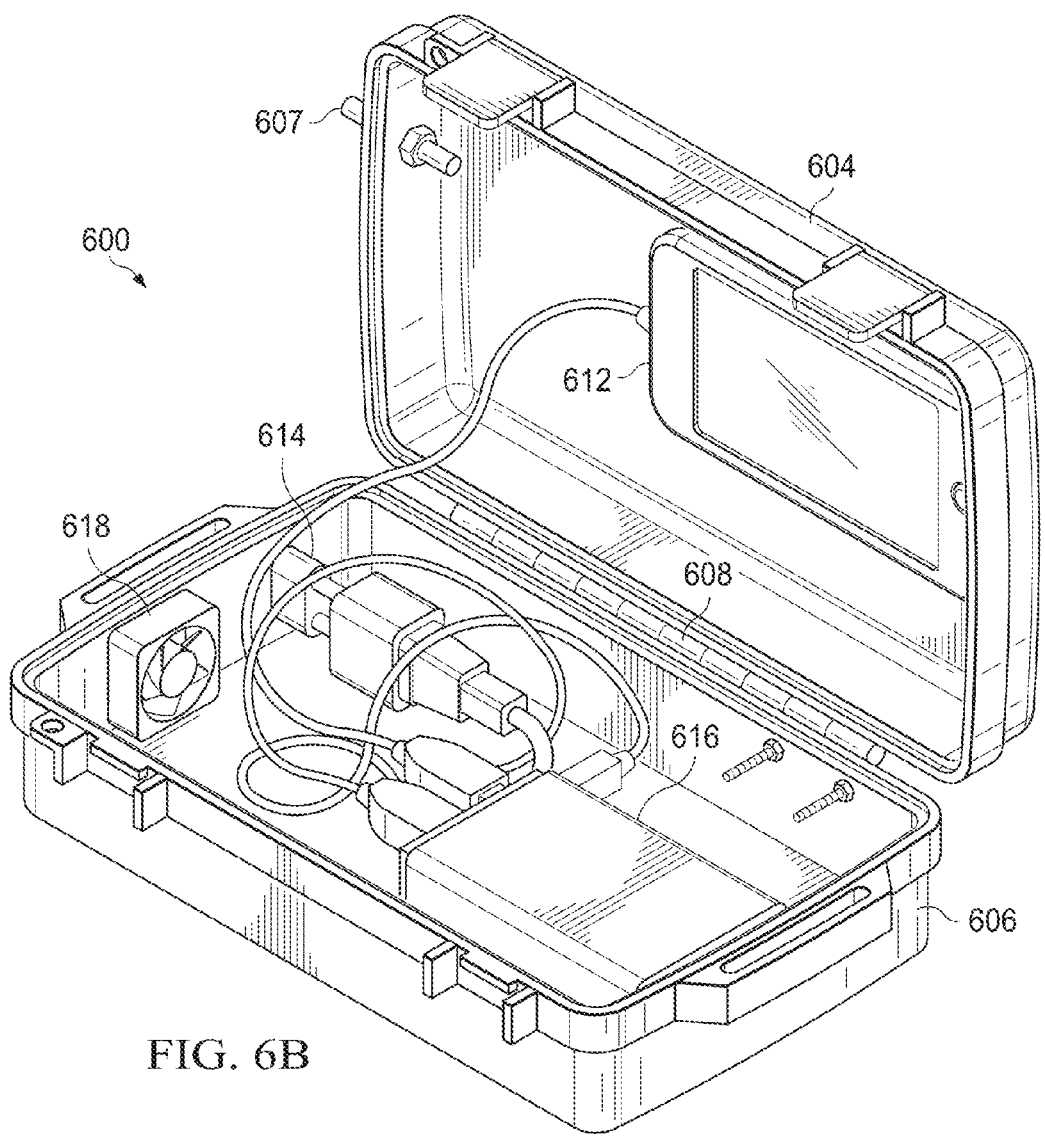
FIG. 6B illustrates a perspective view of the SmartKIT device of FIG. 6A in an open state.

Referring now to FIG. 6B, there is illustrated one embodiment of a SmartKIT 600 in an open state. The SmartKIT 600 includes hinges 608 connecting the upper portion 604 and the lower portion 606, for opening and closing the SmartKIT 600. At the dimensions of 8.81"×5.17"×3.08", a mobile device 612 may be inserted into the upper portion 604 of the SmartKIT 600, to reside there for an indefinite amount of time. A power port 614 offering DC, AC, and car power port compatibility allows for the mobile device 612 to be connected to a power supply to avoid the mobile device 612 running out of battery power. Similarly, a backup battery bank 616 supplying up to 48 hour battery backup is provided to allow the mobile device 612 to be plugged in to charge the mobile device 612. A cooling fan 618 is also provided within the lower portion 606, positioned to blow air into the SmartKIT 600. In this way, the mobile device 612 may be continuously monitored without the battery of the mobile device 612 draining, while keeping the mobile device 612 cool via the cooling fan 618 and protected via the casing 602.

Figure 7A:
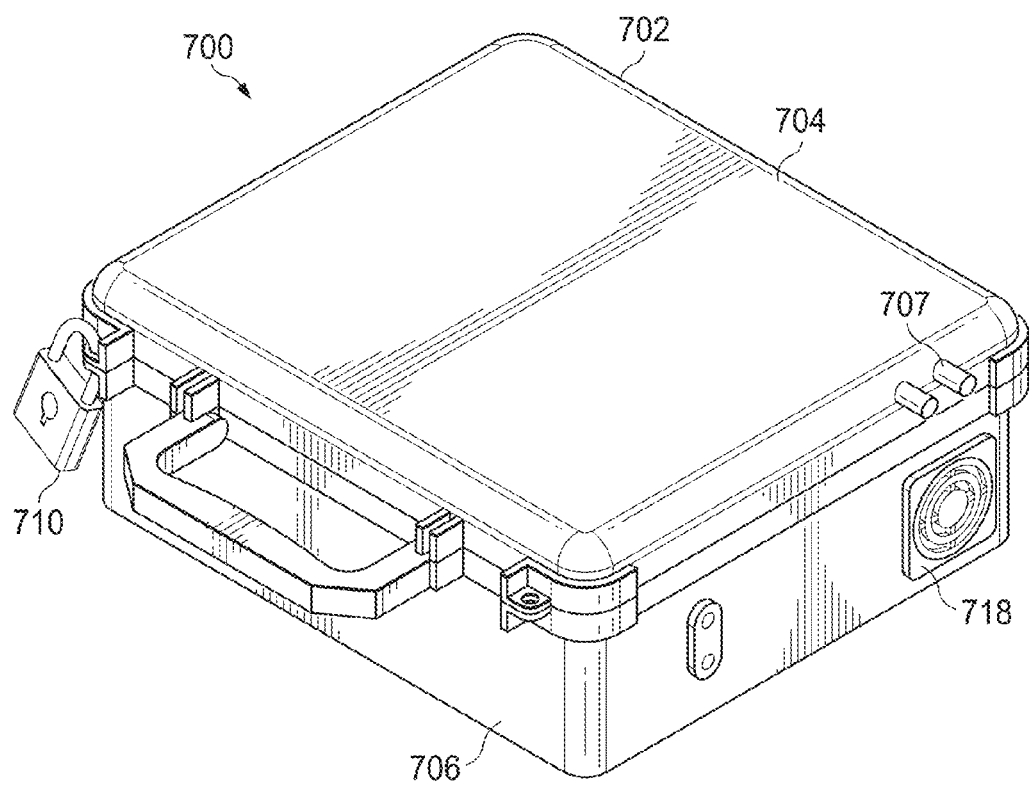
FIG. 7A illustrates a perspective view of one embodiment of a SmartKIT device in a close state.

Referring now to FIG. 7A, there is illustrated another embodiment of a SmartKIT 700 in a closed state. The SmartKIT 700 in the closed state includes a casing 702. The casing 702 may be made out of a durable material such as a hard plastic, or any other appropriate material. The casing is divided into an upper portion 704 and a lower portion 706. The SmartKIT 700 also includes an external GPS device and antenna 707, as well as an external lock 710.

Figure 7B:
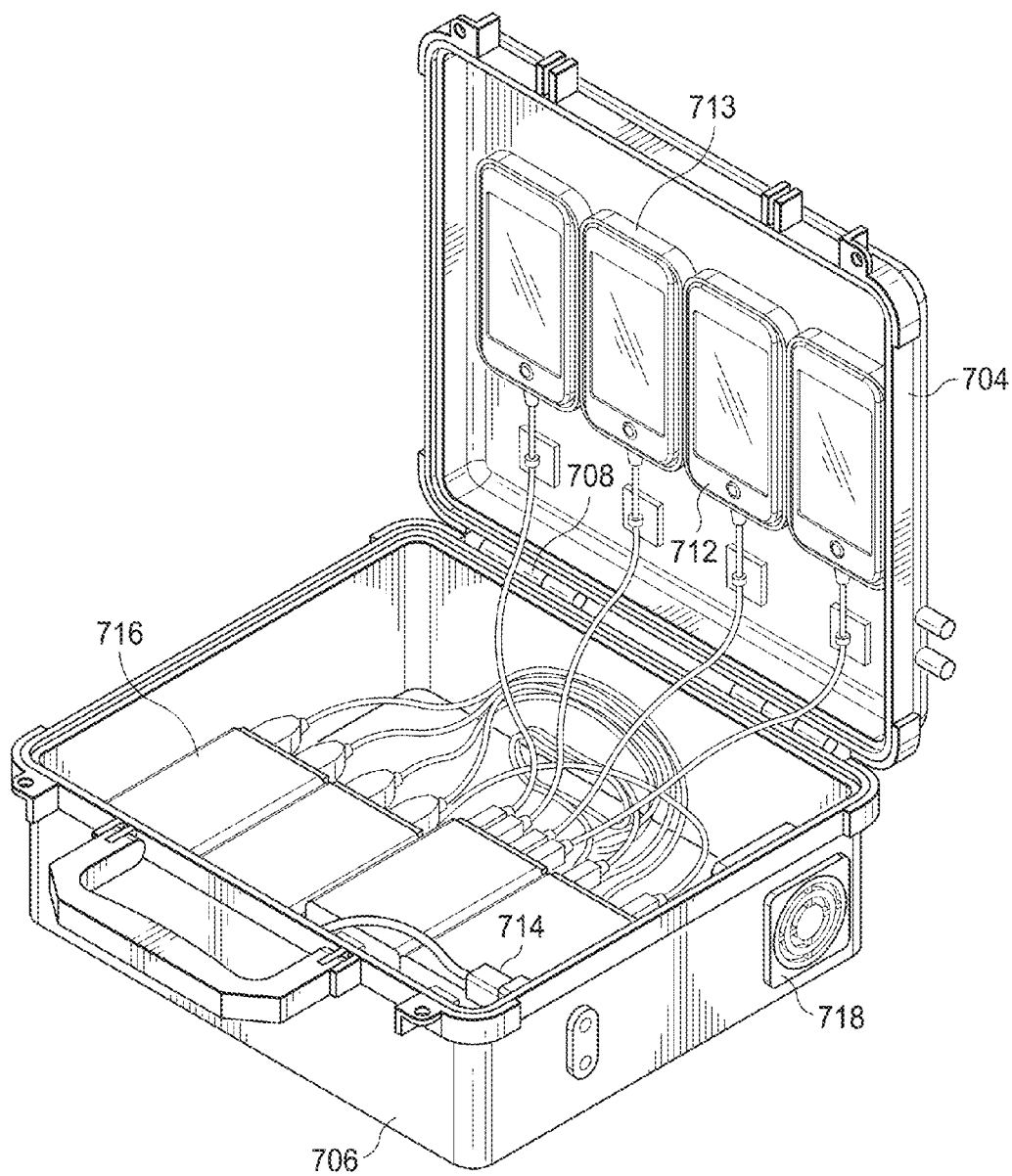
FIG. 7B illustrates a perspective view of the SmartKIT device of FIG. 7A in an open state.

Referring now to FIG. 7B, there is illustrated one embodiment of a SmartKIT 700 in an open state. The SmartKIT 700 includes hinges 708 connecting the upper portion 604 and the lower portion 706, for opening and closing the SmartKIT 700. At the dimensions of 13.5"×11.9"×5.5", a plurality of mobile devices 712 may be inserted into a plurality of slots 713 located in the upper portion 704 of the SmartKIT 700, to reside there for an indefinite amount of time. A power port 714 offering DC and AC compatibility allows for the plurality of mobile devices 712 to be connected to a power supply to avoid the plurality of mobile devices 712 running out of battery power. Similarly, a backup battery bank 716 supplying up to 48 hour battery backup is provided to allow the plurality of mobile devices 712 to be plugged in to charge the plurality of mobile device 712. A cooling fan 718 is also provided within the lower portion 706, positioned to blow air into the SmartKIT 700. In this way, the plurality of mobile devices 712 may be continuously monitored without the batteries of the plurality of mobile devices 712 draining, while keeping the plurality of mobile devices 712 cool via the cooling fan 718 and protected via the casing 702.

SmartProbes and SmartKITs can be deployed in multiple geographic locations and allow for impromptu field testing and advanced troubleshooting (VoLTE, SRVCC, VoWiFi, Layer 3, etc.), are remotely managed, include cloud and browser based access, and provide constant monitoring of a network. Example uses of SmartProbes and SmartKITs include installation in stadiums, hotels, convention centers, airports, or other locations, as well as stores, vehicles, and device vendors. The SmartProbes and SmartKITs provide monitoring, benchmarking, troubleshooting, and threshold based alerts. For instance, SmartProbes and SmartKITs may be used at venues such as NASCAR, Six Flags, or sports stadiums for monitoring large event WiFi or cellular deployments. SmartProbes and SmartKITs are portable, secure, stackable, weatherproof, provide a battery backup, provide cooling fans, are Telco grade, and have internal and external mounting capability. They can easily be deployed, can be remotely managed, and can always be accessible.

Additionally, SmartProbes and SmartKITs have the following testing capabilities: voice, data, messaging, location, RAN—cellular, WiFi, mobility, roaming, voice quality, video quality, load generation, low cost drive testing and can report via live dashboards, advanced reports, real time alerts, data storage for trends, central log repository, and correlation of logs and events. The platform, used in conjunction with a stationary probe, provides many benefits, including saving cost via remote control, allowing for low cost technicians to use the probes, engineers to remotely manage the tests, and maintenance (including upgrading software or restarting the device) to be done remotely. In addition, time is saved via automation of scheduling and execution of test scenarios, automatic retrieval and collection of measurements and logs, and automatic generation and distribution of reports. Additionally, stationary probes provide flexibility and ease of use by running full test scenarios, including voice calls, messaging and data, running specific test scenarios, such as data performance only, and customizing test scenarios depending on field needs. Probes also improve QoS via actionable alerts, including automated alerts that can be sent periodically (such as every 10 minutes), quick alerts that can trigger quick maintenance actions to improve QoS, and alert criteria that can be customized and configured. Probes also increase network visibility via reports, due to rich reports and dashboards being available, customizable reports that can be added, and reporting that can be enhanced as a managed service.

Referring now to FIG. 8, there is illustrated a sample SmartProbe and SmartKIT report 800. The report 800 may be sent periodically, or based on some business rule or trigger event previously decided upon by the company using the SmartProbes and SmartKITs. The report includes a title row 802. The report 800 includes a plurality of columns 804, each one of the plurality of columns 804 being associated with a carrier, such as AT&T, Sprint, and Verizon. The report 800 further includes a plurality of rows 806 containing various data points and values, including signal strength, ping latency, HTTP download throughput, HTTP upload throughput, originating voice call success rate, originating voice call setup time, terminating voice call success rate, and terminating voice call setup time.

The platform allows for first office application support, network changes (VoLTE, SRVCC, VoWiFi, IMS, SDN, NFV, etc.), new device testing, video, voice quality testing. Maintenance window automation allows for a software or hardware upgrade or topology change in a RAN, core, or transport network to be remotely managed. This includes fully automated E2E testing, and can be repeated before, after, and during a maintenance window to ensure there are no service impacts during and after the upgrade. Further, 100 plus tests can be executed in less than ten minutes, leaving more time for upgrade teams to respond. Logs are collected as part of text execution and stored for further analysis. Easy to read maintenance window reports are emailed at the end of the testing. Additionally, multiple maintenance windows can be supported at the same time with different test plans. SmartProbes and SmartKITs provide low cost drive and field testing, multiple devices in a SmartKIT, and voice, data, messaging, GPS, RF, RAN, Core, and L3 testing. Additionally, KPIs are made available in real time, network decoding or exporting is providing to QMDX and Actix formats, shakedowns, UAT, E2E testing, QoS, QoE, optimization, benchmarking, troubleshooting, upgrades, and carrier-aggregation can be reported, and device or network under the test can be identified.

The platform can be implemented and deployed in various scenarios. Crowd sourcing on commercial phones allows for employees, contractors, vendors employees, subscribers, and demo devices in retail stores to be users of the platform. SmartProbes and SmartKITs allow for cells sites, central offices, vendor's premises, retail stored, MVNO partner stores, taxi cabs, company vehicles, logistics partners, and others to be users of the platform. Also, subscriber devices can be provided customer care via the platform, as well as running tests on subscriber devices, such as benchmarking or troubleshooting. The platform provides many benefits, including a fully automated cloud platform, the ability to configure, analyze, and manage solutions from anywhere anytime resulting in cost savings, advanced analytics allowing for an integrated business intelligence engine enabling effective decision making, real time reporting offering business intelligence, reporting, and rules engine allowing for visualization to make effective decisions, and an extensible platform offering the ability to build new test scenarios, add new devices and network elements, and to create new reports easily.

Automated testing for VoLTE, VoWiFi, SRVCC, CSFB, and others includes registration, MO and MT calls, MO and MT SMS, MO and MT MMS, browsing and streaming, handover from VoWiFi to VoLTE, handover from VoLTE to VoWiFi, handover from VoWiFi to VoLTE to SRVCC (3G/2G), metrics related to WiFi, cellular/radio, core network, metrics related to device, location correlation, negative tests, conflict tests, and advanced tests including voice quality, conference call VQT, load generation in lab and field, and IRAT automation using attenuators.

Figure 9A:
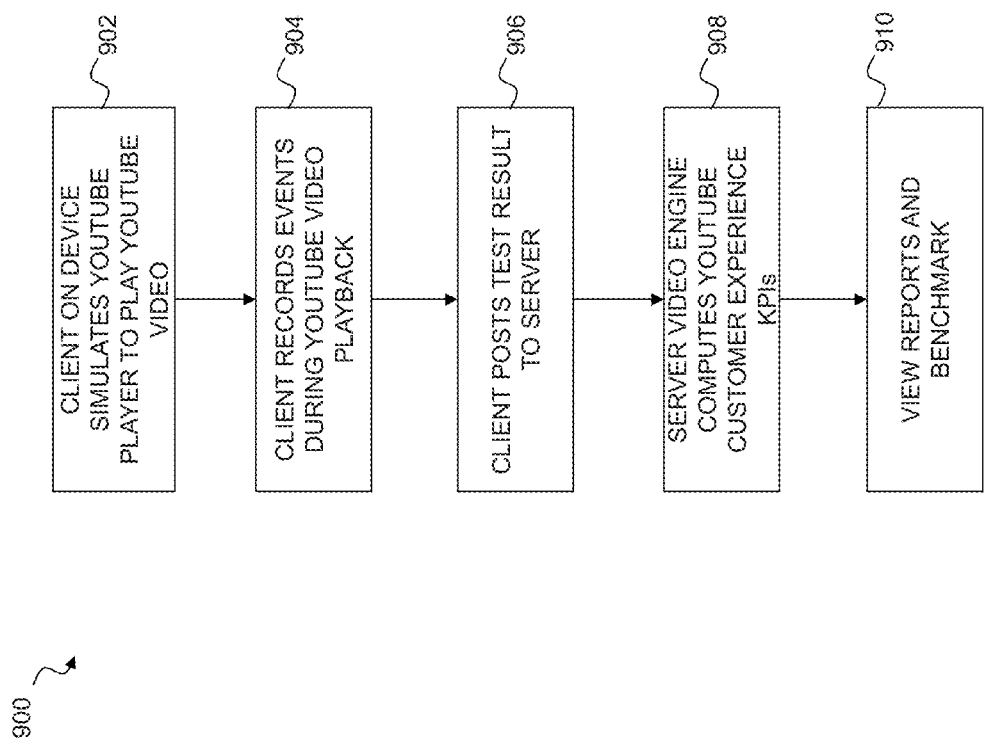
FIG. 9A illustrates a flowchart of one embodiment of a YouTube™ customer experience test method.

Referring now to FIG. 9A, there is illustrated a flowchart of a YouTube customer experience management test method 900. At step 902, the IA client on a device 102 simulates a YouTube player to play a YouTube video. At step 904, the client records events during YouTube video playback, such as video size, time to playback, pause playing, resume playing, etc. At step 906, the client posts test results to the server 104. At step 908, the server 104's video engine computes YouTube customer experience KPIs. At step 910, reports and a benchmark are viewed.

Referring now to FIG. 9B, there is illustrated a sample YouTube customer experience management KPI report 912. The KPIs computed and reported may include video resolution in width by height pixels when the client plays the video. The client will play high resolution video when network performance is good. The client may also keep the same resolution in one video playing session. The KPIs may also include time to playback, which is the video buffering time from starting to ready for playback. Less buffering time means better network performance. The KPIs may also include count of pause, which is the total number of pause occurrences in one video playing session. Less count of pause means better network performance, and should be zero in a good network condition. The KPIs may also include time to first pause, which is the time from playback to first pause state. A longer time to first pause means better network performance. The KPIs may further include time to resume playback, which is the buffering time from pause to playback again. Less buffering time indicates better network performance. The KPIs may also include completion time, which is the time from first playback to completion of the test or of playback of the video. The client may then compute a YouTube score. It will be understood by one skilled in the art that this manner of test may be applied to video services other than YouTube, such as Hulu or Netflix.

Figure 10A:
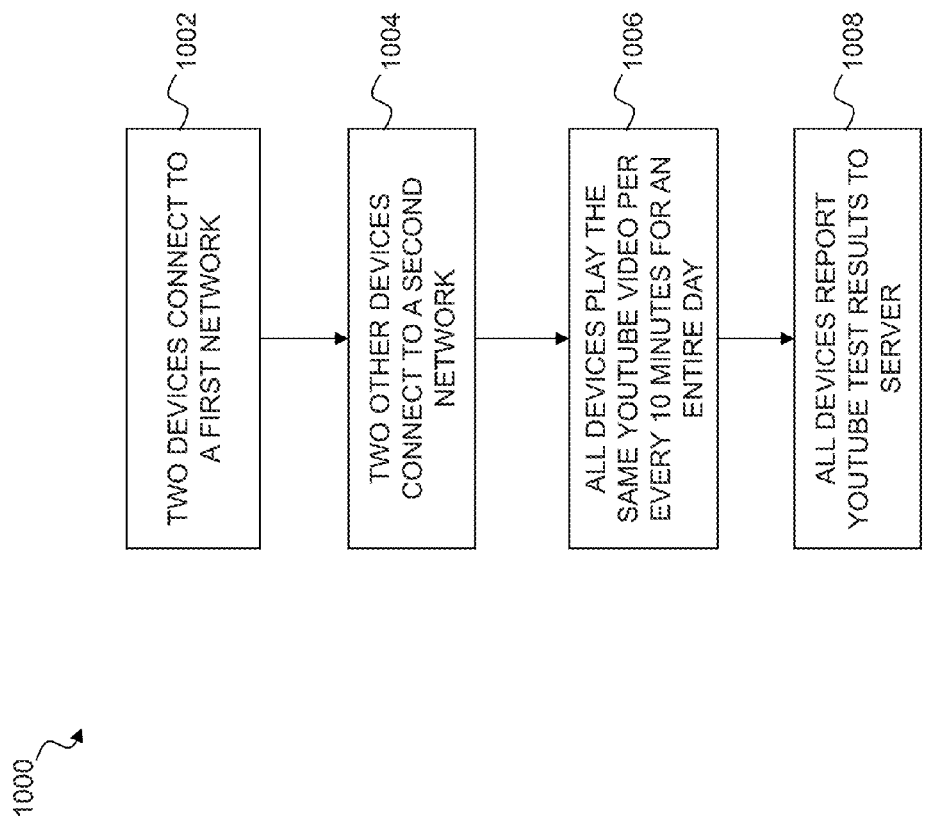
FIG. 10A illustrates a flowchart of one embodiment of a customer service video test method.

Referring now to FIG. 10A, there is illustrated a flowchart of a customer service video test method 1000. At step 1002, two devices connect to a first network, such as T-Mobile's LTE network. At step 1004, two other devices connect to a second network, such as AT&T's LTE network. At step 1006, all the devices play the same YouTube video per every 10 minutes for an entire day. At step 1008, all the devices report test results to the server 104. This allows the customer experience on both the first and second networks to be compared.

Figure 10B:
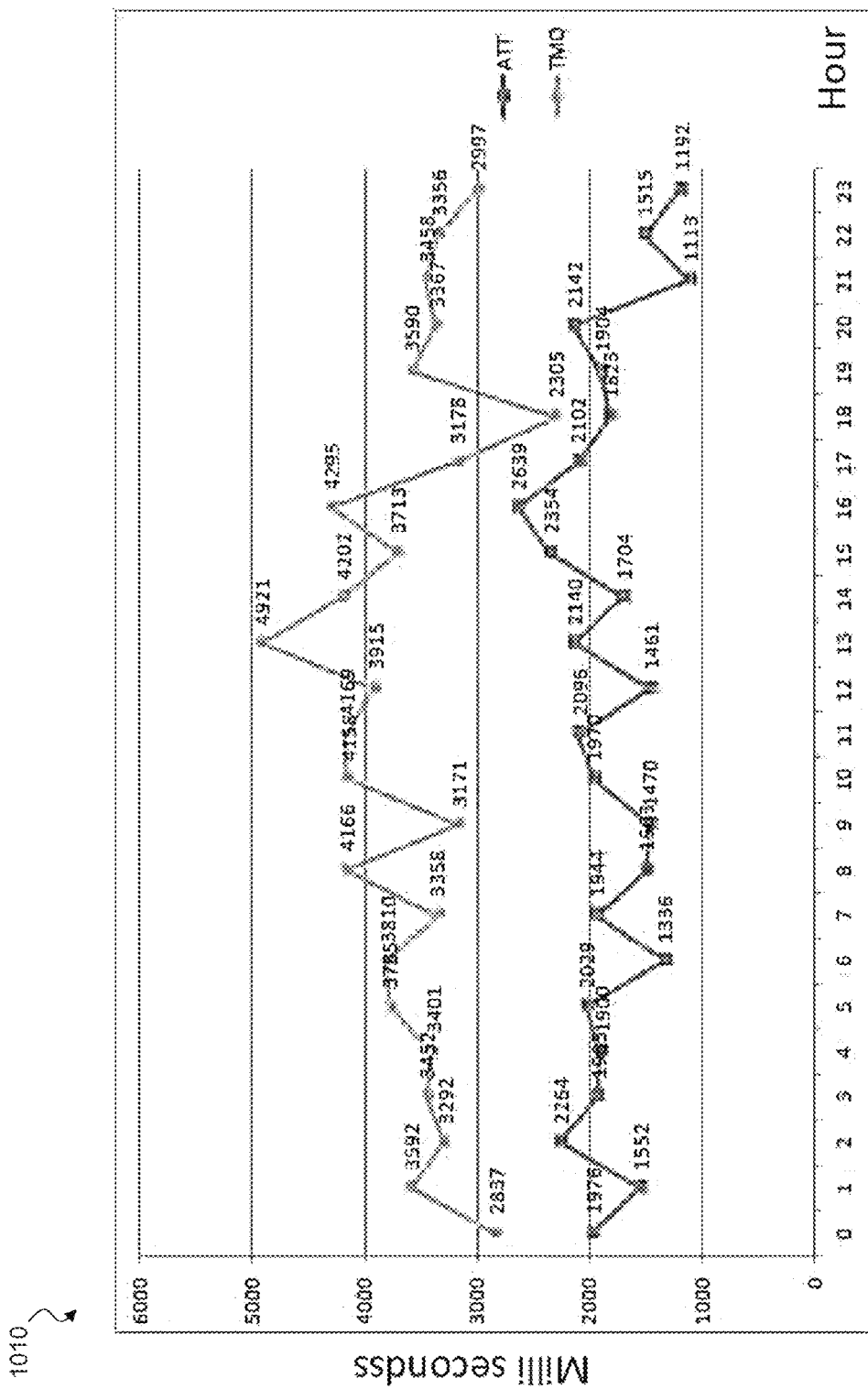
FIG. 10B illustrates one embodiment of an "average time to playback comparison" report.

Referring now to FIG. 10B, there is illustrated a sample "average time to playback Comparison" report 1010. The report 1010 shows the average time in milliseconds that it took for the devices to begin playback, separated out for each network. This is depicted as a dotted line graph, with a line for each network and dot for each hour of the day for the test. The sample report 1010 indicates that the T-Mobile network performed much slower than the AT&T network, as its average time to playback was much higher.

It will be appreciated that other similar graphs may be provided for all tests disclosed herein, included line graphs, bar graphs, or other graphical representations of data, for a variety of test metrics, including RSSI, network latency, HTTP upload throughput, HTTP download throughput, FTP upload throughput, FTP download throughput, video playback time, WiFi connect time, WiFi transition and distribution.

Figure 11A:
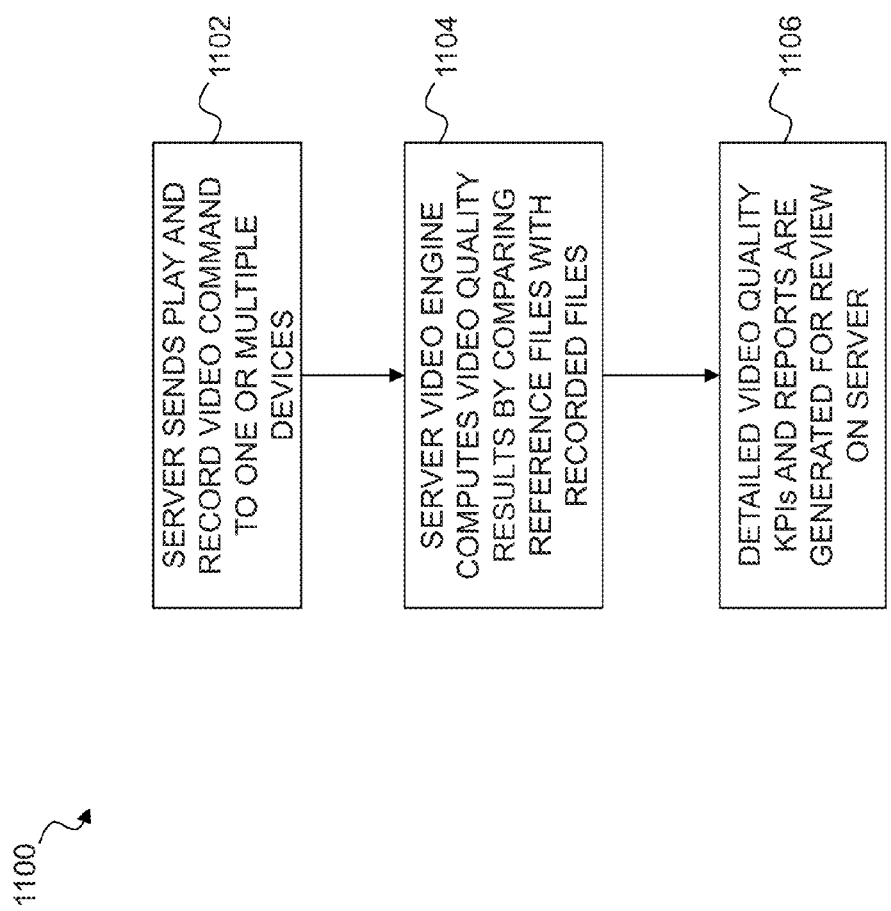
FIG. 11A illustrates a flowchart of one embodiment of a video quality test method.

Referring now to FIG. 11A, there is illustrated a video quality test method 1100. At step 1102, the server 104 sends a "PlayAndRecordVideo" command to the client on one or more devices 102. At step 1104, the video engine on the server 104 computes video quality results by comparing reference files stored on the server 104 with the recorded files. At step 1106, detailed video quality KPIs and reports are generated for review on the server 104. In another embodiment, reference files may be stored/uploaded to YouTube instead of being stored on the server. These reference videos are played by the devices, with the video being recorded. The server 104 would then compute video quality and store results in the database 112. These results could be viewed or emails as reports, and could be viewed in a web browser.

Video quality test reference files may be in a VQEG multimedia benchmark ITU-T J.247 standard, at a particular framerate (such as 25 FPS), in a file format such as YUV420p, be of particular file sizes, and have a particular video length, such as 8.8 seconds. Additionally, different video formats may be used, such as QCIF (176×144 resolution), CIF (352×288 resolution), and VGA (640×480 resolution).

Video quality test KPIs that can be reported include perceptual evaluation of video quality (PEVQ) mean opinion score (MOS). The PEVQ MOS score can range from 1 (bad) to 5 (excellent), and is based on a multitude of perceptually motivated parameters. The test KPIs further include distortion indicators, which provide a detailed analysis of the perceptual level of distortion in the luminance, chrominance, and temporal domain. KPIs also include delay, which is the min, max and mean delay of each frame of the test signal related to the reference signal, as well as delay vs. time. The KPIs can also include brightness (the brightness of the reference and degraded signal) and contrast (the contrast of the distorted and the reference sequence). Peak signal-to-noise ratio (PSNR) can also be provided for the Y, Cb, and Cr components separately. The KPIs can also include jerkiness, which is an indicator of the smoothness of the video playback which is often impaired by down-sampling, coding processes, and perturbed transmissions.

Other KPIs that can be provided include blur, which is the distortion characterized by reduced sharpness of contour edges and spatial detail, and blockiness, which is the result of a low bit rate coding that uses a block matching algorithm for the motion estimation and a coarse quantization for the image blocks. KPIs can also include frame skips and freezes, which are the temporal artifacts that occur in video transmissions that can be caused by overloaded networks. Effective framerate may also be a KPI. Down-sampling of a video signal on a frame by frame basis often results in loss of information which leads to the degradation of the video signal. The effective framerate is an indicator quantifying the severity of such a process. The KPIs may also include temporal activity and spatial complexity, which are indicators that quantify the amount of activity/movement and spatial detail in the video content. These indicators are derived from ITU-T recommendations.

Report examples include daily/weekly/monthly/yearly video quality test (ViQT) score charts, per ViQT test sample detailed report, hourly/daily/weekly trending of ViQT scores, ViQT scores by network types (LTE, UMTS, WiFi), monthly/yearly historical trending of ViQT scores by device model, and monthly/yearly historical trending of ViQT scores by device OEM. Other reports may include correlation of ViQT scores to radio conditions (RSRP, RSSI, RSRQ, etc.), comparison of VIQT scores between different WiFi devices or network OEM vendors, comparison of ViQT scores between different versions of software and hardware, comparison of ViQT scores to different handsets/devices, comparison of ViQT scores for the same device with different software versions, and comparison of ViQT results across different codecs. Custom reports may also be generated.

Figure 11B:
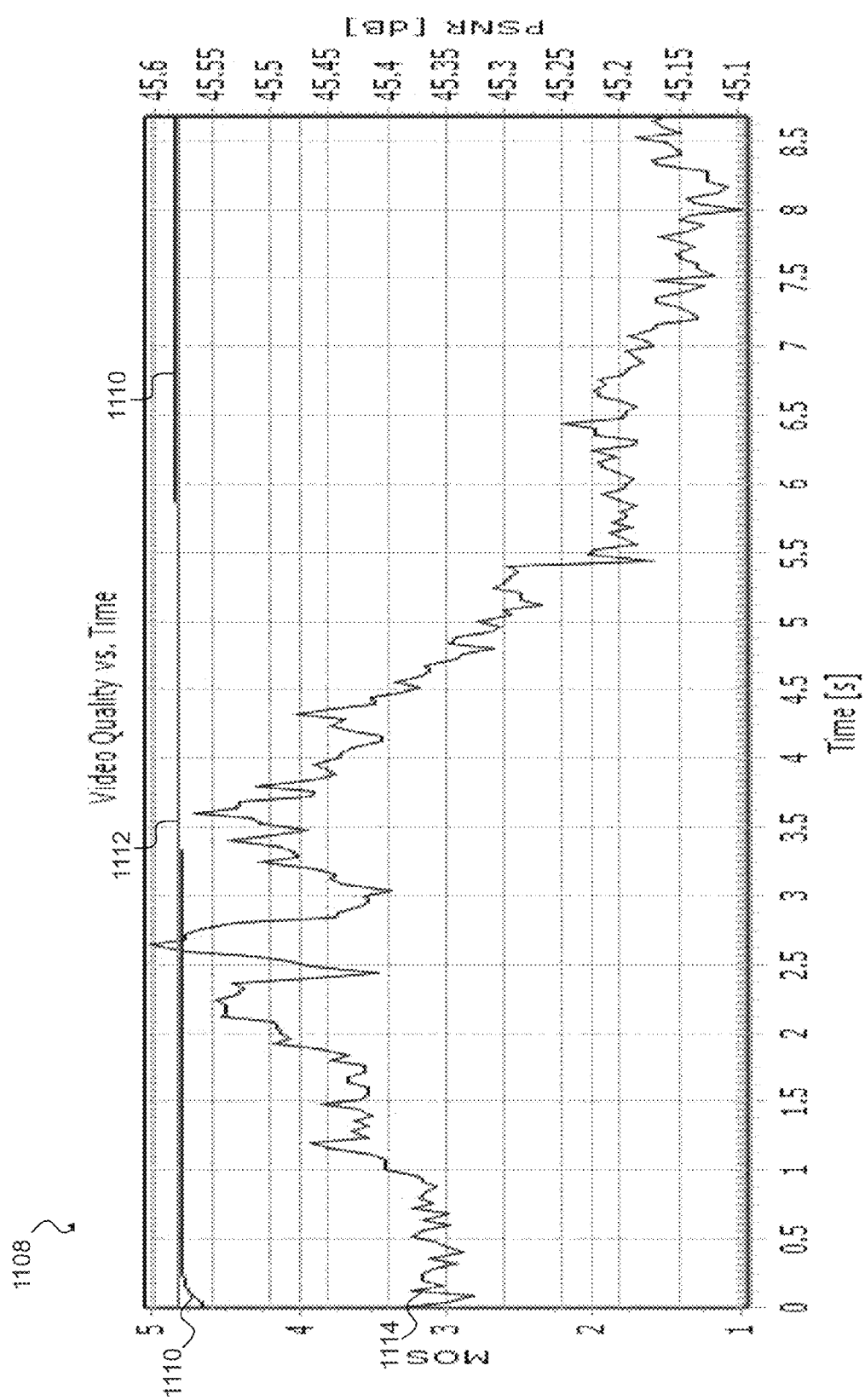
FIG. 11B illustrates one embodiment of a video quality test report.

Referring now to FIG. 11B, there is illustrated a sample ViQT test report 1108. The report 1108 is a line graph having time in second along the x axis and MOS (from 1 to 5) along the y axis on the left side of the graph (corresponding to the PEVQ MOS score), with PSNR also along the y axis on the right side of the graph. The MOS over time is denoted by lines 1110, and the average MOS is denoted by a line 1112. A line 1114 denotes the PSNR over time, fluctuating between a good PEVQ MOS score (5) and a bad PEVQ MOS score (1).

Figure 11C:
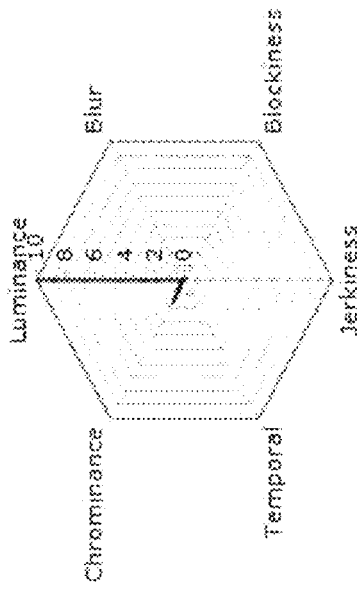
FIG. 11C illustrates one embodiment of a video quality test report.

Referring now to FIG. 11C, there is illustrated another sample ViQT report 1116. The report lists various KPIs such as jerkiness, number of frames, brightness, contrast, PSNR, etc., and their accompanying values.

The platform may also be used for video quality testing for both service providers infrastructure OEMs and services providers device OEMs, including video quality experience testing, video CODEC benchmarking, VQ impact due to network compression, lab/test automation for video quality, video quality testing for new devices, VQ impact due to device compression, VQ impacts due to RF conditions, VQ impacts during IRAT hand-overs, VQ based network benchmarking, video quality test and automation, device CODEC benchmarking, video related IoT for 3G and LTE, impact of device based compression, impact of device SW, and video quality based device benchmarking.

Figure 12:
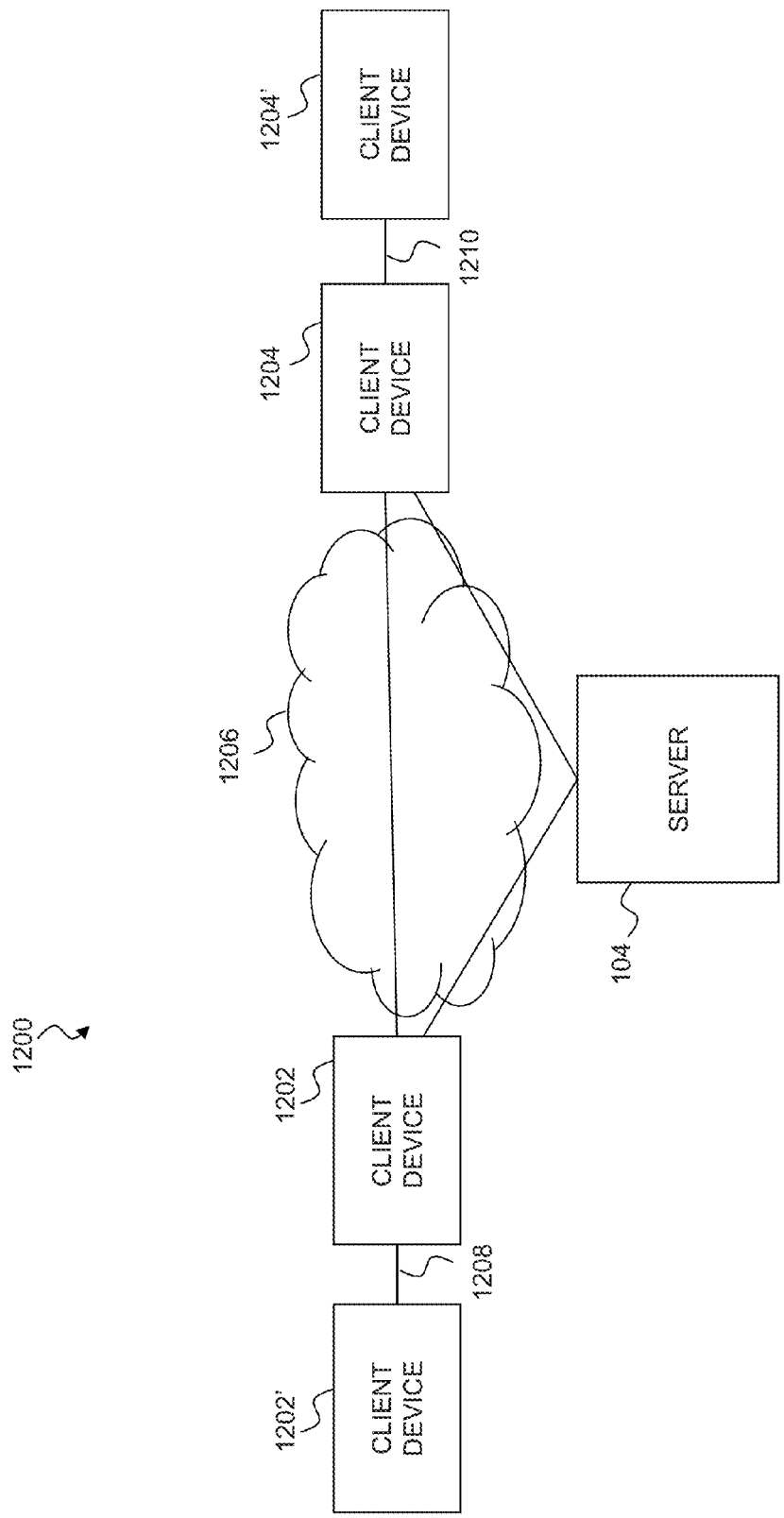
FIG. 12 illustrates one embodiment of a voice quality test system.

Referring now to FIG. 12, there is illustrated a voice quality test system 1200. The system 1200 includes the server 104 connected to client device 1202 and client device 1204 over a network 1206. Client device 1202 is connected to another client device 1202' by a TRRS cable 1208. Similarly, client device 1204 is connected to another client device 1204' by a TRRS cable 1210. The client devices may be 3G, 2G, VoWiFi, VoLTE, VoIP, or other devices.

Figure 13A:
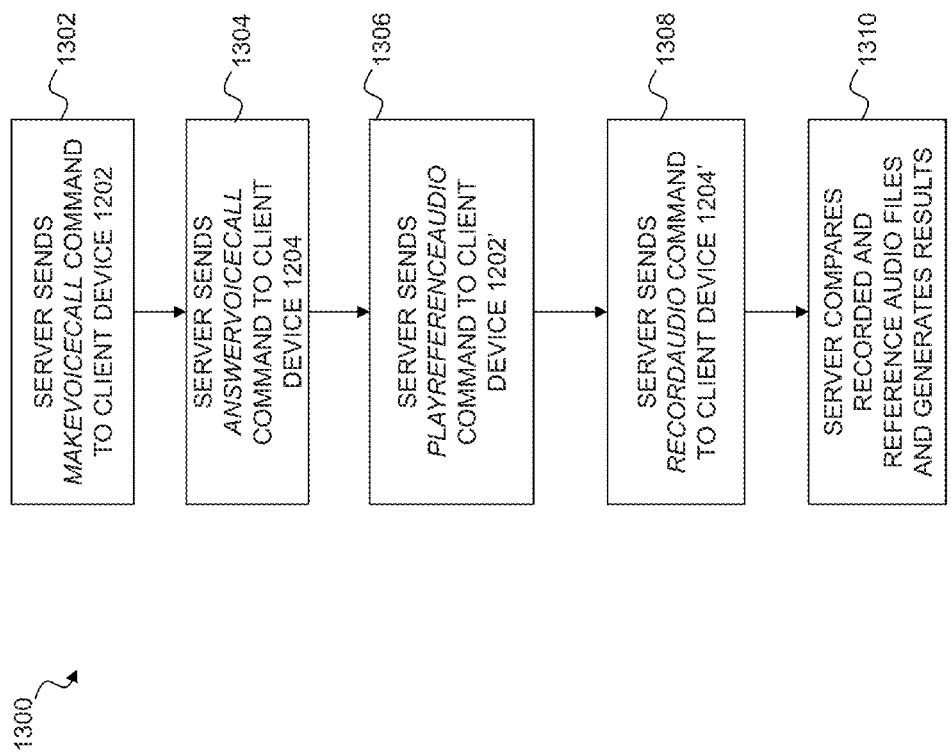
FIG. 13A illustrates a flowchart of one embodiment of a voice quality test method.
Figure 13B:
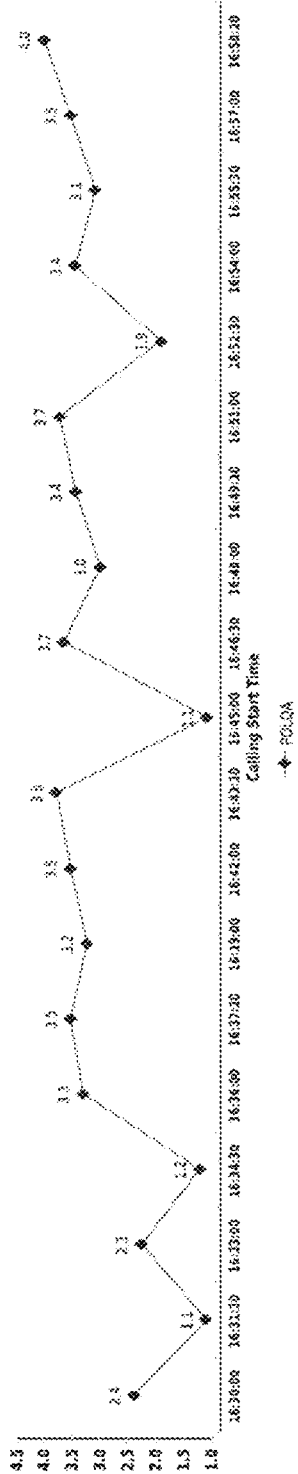
FIG. 13B illustrates one embodiment of a voice quality test report.

Referring now to FIG. 13A, there is illustrated a voice quality test method 1300 using the system 1200. At step 1302 the server 104 sends a MakeVoiceCall command to client device 1202 and at step 1304 the server 104 sends an AnswerVoiceCall command to client device 1204. This establishes a voice call between client devices 1202 and 1204. At step 1306, the server 104 sends a PlayReferenceAudio command to client device 1202', causing the client device 1202' to play reference audio files. At step 1308, the server 104 sends a RecordAudioCommand to client device 1204', instructing the client device 1204' to record the audio of the client device 1204. At step 1310, the server 104 compares the recorded and reference audio files and generates results of the test. FIG. 13B, illustrates a sample voice quality KPI report 1312.

During the voice quality test, the client running on the devices can collect the voice call, VoWiFi progress, WiFi signal strength and LTE RSSI during the test. At the same time, the test will be running on the devices to get associated test scores. While a tester is moving with device 1202 and device 1202', the voice quality scores of VoWiFi, VoLTE, and handover between them can be collected and stored in the database 112.

Referring now to FIG. 13C, there is illustrated a handover between VoWiFi and VoLTE voice quality score report 1314. Table 1316 shows the voice call initials on a device having an ID of 1323, having a call that originated at Dec. 16, 2014 19:12:00 and ending at Dec. 16, 2014 19:23:33. Table 1318 shows various data at different times during the call. For instance, at 19:12:10, the WiFi signal strength was −69 dBm, so a VoWiFi call is initialized. At 19:16:10 the WiFi signal strength drops to −91 dBm, causing a handover process to VoLTE since LTE RSSI is at −65. At 19:17:10, handover to VoLTE is successful. At 19:18:28, it is detected that WiFi signal strength has improved to −64. At 19:18:32, handover from VoLTE to VoWiFi is accomplished.

Figure 14:
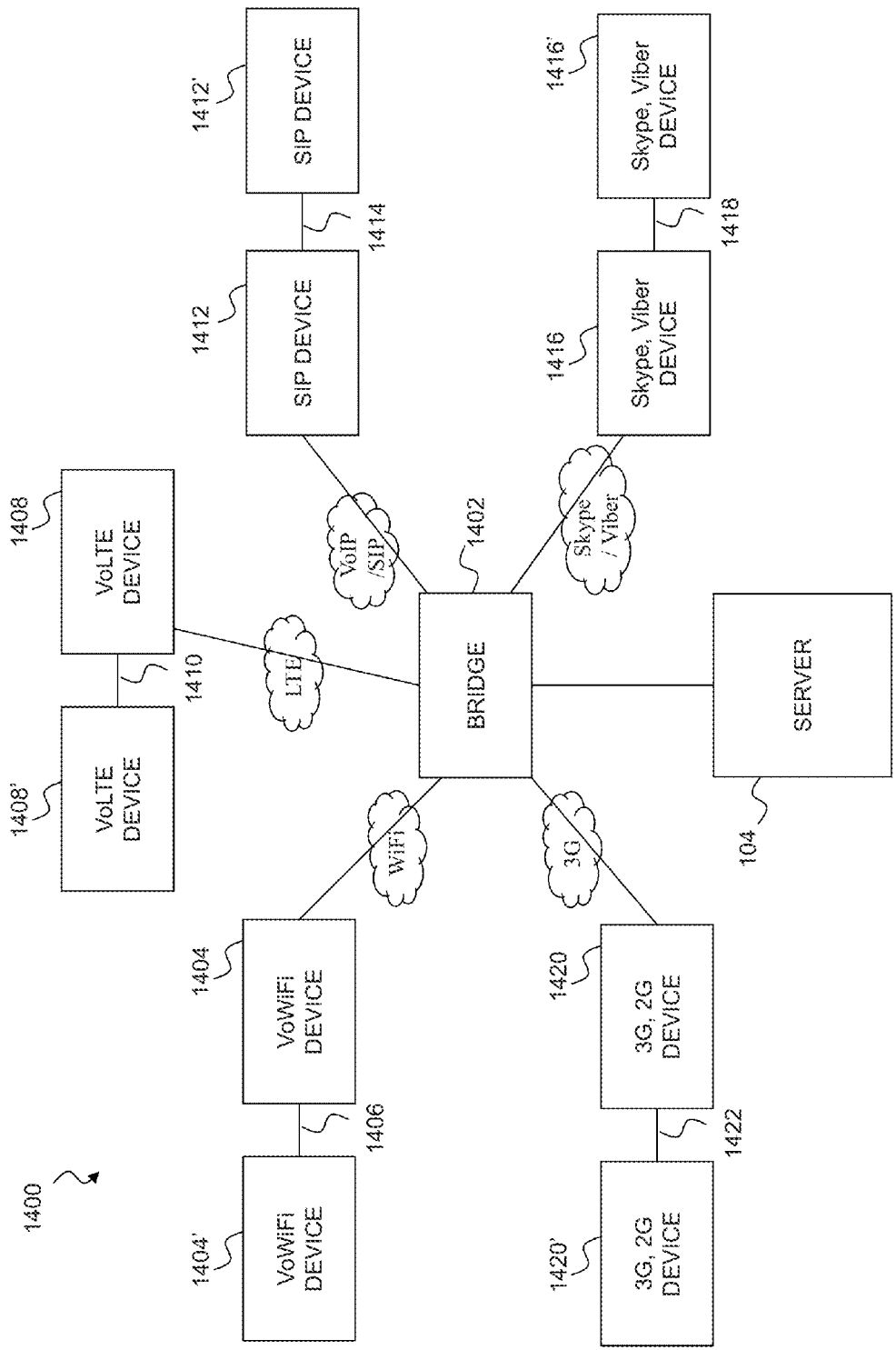
FIG. 14 illustrates one embodiment of a multi-technology voice quality testing system.

Referring now to FIG. 14, there is illustrated a multi-technology voice quality testing system 1400. The system 1400 includes a bridge 1402 connected to the server 104. The bridge 1402 server to connect devices utilizing different technologies. The system further includes VoWiFi devices 1404 and 1404' connected by a TRRS cable 1406, VoLTE devices 1408 and 1408' connected by a TRRS cable 1410, SIP devices 1412 and 1412' connected by a TRRS cable 1414, Skype/Viber devices 1416 and 1416' connected by a TRRS cable 1418, and 3G/2G devices 1420 and 1420' connected by a TRRS cable 1422.

Figure 15:
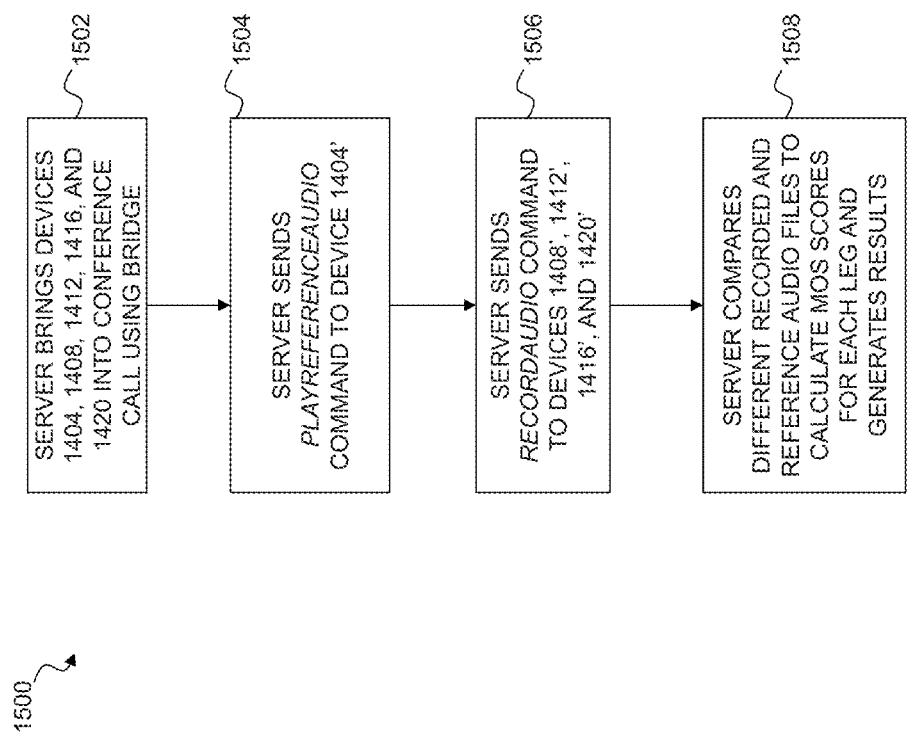
FIG. 15 illustrates a flowchart of one embodiment of a voice quality testing method.

Referring now to FIG. 15, there is illustrated a multi-technology voice quality testing method 1500 using the system 1400. At step 1502, the server 104 brings devices 1404, 1408, 1412, 1416, and 1420 into a conference call using the bridge 1402, creating a leg for each technology types (WiFi, LTE, 3G/2G, Skype/Viber, VOIP/SIP). At step 1504, the server sends a PlayReferenceAudio command to VoWiFi device 1404'. At step 1506, the server sends a RecordAudio command to VoLTE device 1408', SIP device 1412', Skype/Viber device 1416', and 3G/2G device 1420'. At step 1508, the server compares the different recorded and reference audio files to calculate MOS scores for each leg and generates results of the test.

Figure 16:
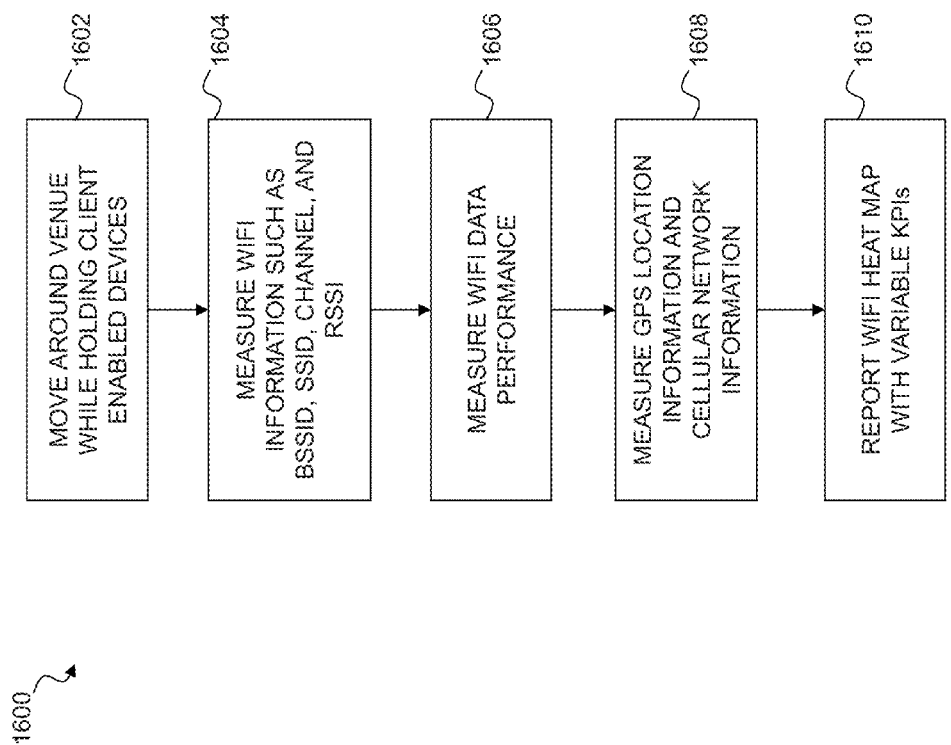
FIG. 16 illustrates a flowchart of one embodiment of a walk-testing method for a WiFi network.

Referring now to FIG. 16, there is illustrated a walk-testing for a WiFi network method 1600. At step 1602, a person or some other actor moves around a venue while having IA client enabled devices in his possession. At step 1604, the IA client enabled devices measure WiFi information such as BSSID, SSID, channel (2.4 Ghz and 5 Ghz, etc.), RSSI, and other information. At step 1606, WiFi data performance is measured. At step 1608, GPS location information and cellular network information is measured. At step 1610, a WiFi heat map with variable KPIs is reported. Thus, a low cost solution is provided for WiFi network drive testing.

Figure 17:
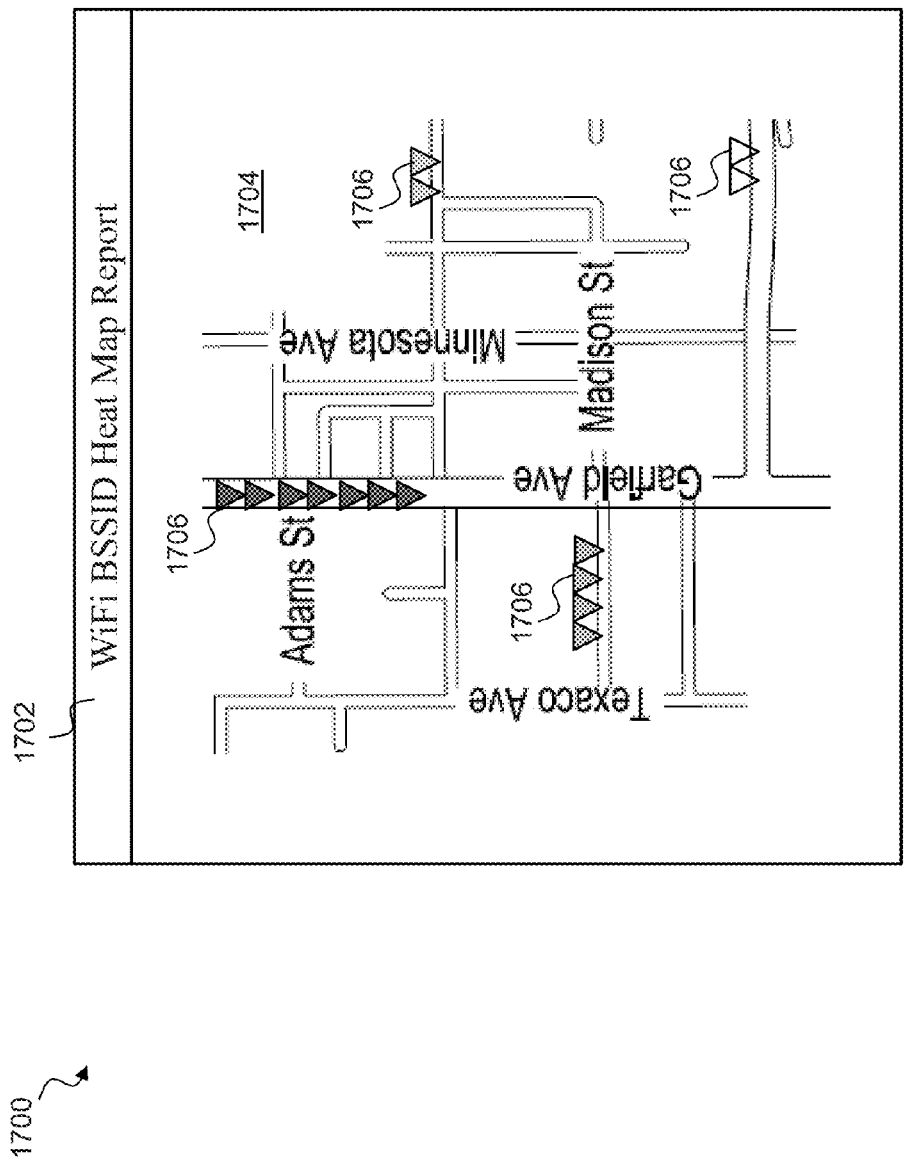
FIG. 17 illustrates one embodiment of a WiFi heat map report.

Referring now to FIG. 17, there is illustrated a WiFi heat map report 1700. The report contains a header 1702 having a title. The report further shows an image of a map 1704 of a particular geographic area. The map 1704 includes thereon a plurality of WiFi heat indicators 1706 of varying shades of color, generated from readings taken in the particular location of each indicator, with darker colors indicating greater signal strength or throughput.

Figure 18:
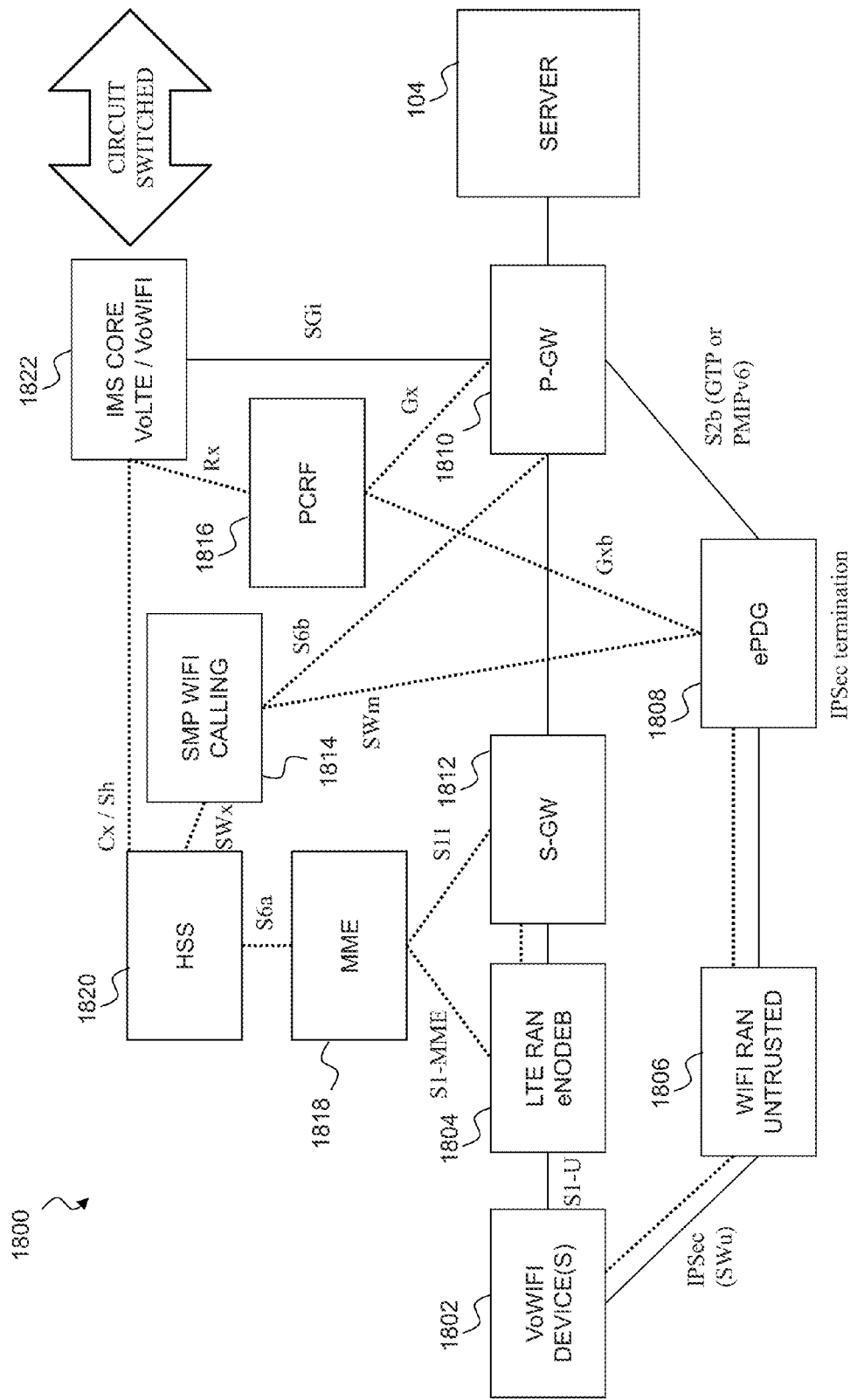
FIG. 18 illustrates one embodiment of a VoWiFi call performance testing system.

Referring now to FIG. 18, there is illustrated a VoWiFi call performance testing system 1800. The system 1800 includes a VoWiFi device 1802 capable of connecting wirelessly to both an LTE RAN node 1804 and a WiFi RAN 1806. In this embodiment, the WiFi RAN 1806 is untrusted. The WiFi RAN 1806 is connected to an evolved packet data gateway (ePDG) 1808, which is in turn connect to packet data network gateway (P-GW) 1810. A voice path is formed between the WiFi RAN 1806, to the ePDG 1808, to a SMP WiFi calling service 1814, and to the P-GW 1810. A voice path is also formed between the WiFi RAN 1806, to the ePDG 1808, to a policy and changing rules function (PCRF) module 1816, and to the P-GW 1810.

The LTE RAN node 1804 is connected to a serving gateway (S-GW) 1812, which is in turn connected to the P-GW 1810. Voice paths are formed between the LTE RAN node 1804 and the S-GW 1812, as well as between the LTE RAN node 1804 and a mobility management entity (MME) 1818. These voice paths are also sent to a home subscriber server (HSS) 1820, with one voice path connecting to the SMP WiFi calling service 1814 and to the P-GW 1810. Another voice path is formed between the HSS and an IP multimedia subsystem (IMS) core 1822, allowing for VoLTE and VoWiFi. The IMS core 1822 may also be circuit switched. Communications are sent through the P-GW 1810 to the server 104.

Figure 19:
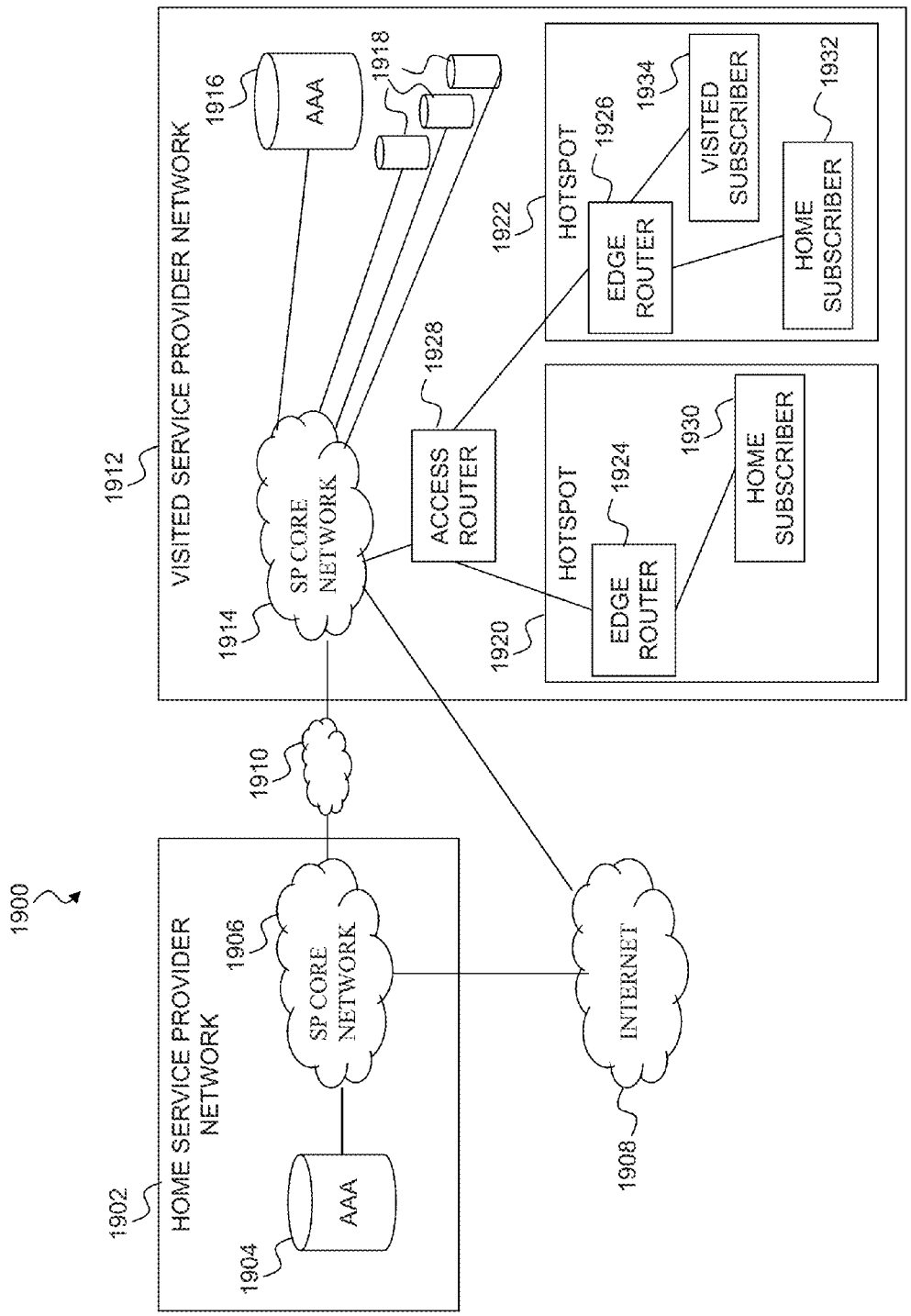
FIG. 19 illustrates one embodiment of a WiFi hotspot testing system.

Referring now to FIG. 19, there is illustrated a WiFi hotspot testing system 1900. The system 1900 includes a home service provider network 1902 having an authentication, authorization, and accounting ("AAA") server 1904 and a core service provider network 1906. The core service provider network 1906 is connected to the Internet 1908 and to roaming hubs network 1910. The system 1900 further includes a visited service provider network 1912 having a core service provider network 1914, AAA server 1916, and available web services 1918. Situated within visited service provider network 1912 are hotspots 1920 and 1922, each having edge router 1924 and 1926, respectively. Edge routers 1924 and 1926 connect to the core service provider network 1914 via an access router 1928. For purposes of example, hotspot 1920 has within it a home subscriber 1930, that is, a subscriber of home service provider network 1902, connected to the edge router 1924 with a device. Hotspot 1922 has within it both a home subscriber 1932 and a visited subscriber 1934 connected to the edge router 1926. Using the IA client on the home subscribers or visited subscribers devices, the data performance on the various networks may be tested and compared, whether the network is a WiFi hotspot, a core service provider network, or cellular network. Additionally, the network performance of the home subscriber 1932 can be compared to the performance of the visited subscriber 1934 on hotspot 1922.

Testing capability for WiFi networks includes tests for WiFi logon and authentication, WiFi radio information, VoWiFi call performance, handover VoWiFi, VoLTE, SRVCC, email/HTTP, data throughput, data latency, video streaming, VoIP and conference calls, WiFi and cellular support, device and network IoT, negative tests, conflict tests, maintenance window automation, large event driven access testing, hotspot 2.0 (by WiFi alliance), and advanced tests including voice quality, video quality, IRAT automation, load generation in lab and field, and remote drive testing.

WiFi metrics to be taken in tests include WiFi information (signal strength, location SSID, security), WiFi performance (time to connect, authenticate on WiFi network, battery impacts), throughput (downlink, uplink throughput using FTP, HTTP, iPERF, UDP, using short files, long files, with and without handovers), web browsing (DNS lookup, first byte download, first page download across any number of popular sites, success rate), and email (E2E delay, success rate, accuracy). WiFi metrics further include video (delay for stream URL, buffering start delay, time delay for playback start, time to buffering or playback completion for video from YouTube or similar services, voice over WiFi (multiple KPIs—retain ability, availability, mobility, MOS/PESQ/POQA), data error rate (packet loss for different sized packets using advanced PING capabilities to multiple URLs), latency (using different PING packets to multiple URLs), data session establishment (authentication, tunnel set up and teardown times for GPRS, 3G, LTE, WiFi), WiFi offload (device data usage metrics per minute, per hour, per day under GPRS, 3G, LTE, WiFi access and different locations and RF conditions), and load and stress testing (E2E delay, success rate, accuracy reported at access point level in aggregated manner).

WiFi end-to-end (E2E) testing may also be performed. This testing may include the automation of E2E alpha testing or FOA for WLAN. The basic features of this testing may include recording location (altitude, longitude, latitude) of testing spot, recording AP SSID and AP MAC, authentication type and WiFi mode, measuring WiFi RSSI (signal level), channel, and SNR (signal noise ratio), running ping testing, recording ping latency, and ping loss rate, and downloading files, uploading files, and recording download and upload throughput. Advanced features of WiFi E2E testing include running SIP call (VoIP), recording voice latency, voice MOS (mean opinion score), switching terminal between WiFi and 4G, recording roaming latency, switching terminal among APs of one WLAN, recording roaming latency, making groups of terminal join certain SSIDs and recording performance of certain AP from terminals, measuring max number of terminals that can join a particular AP, and measuring RSSI of other SSIDs (other than that which client application is connected).

Figure 20:
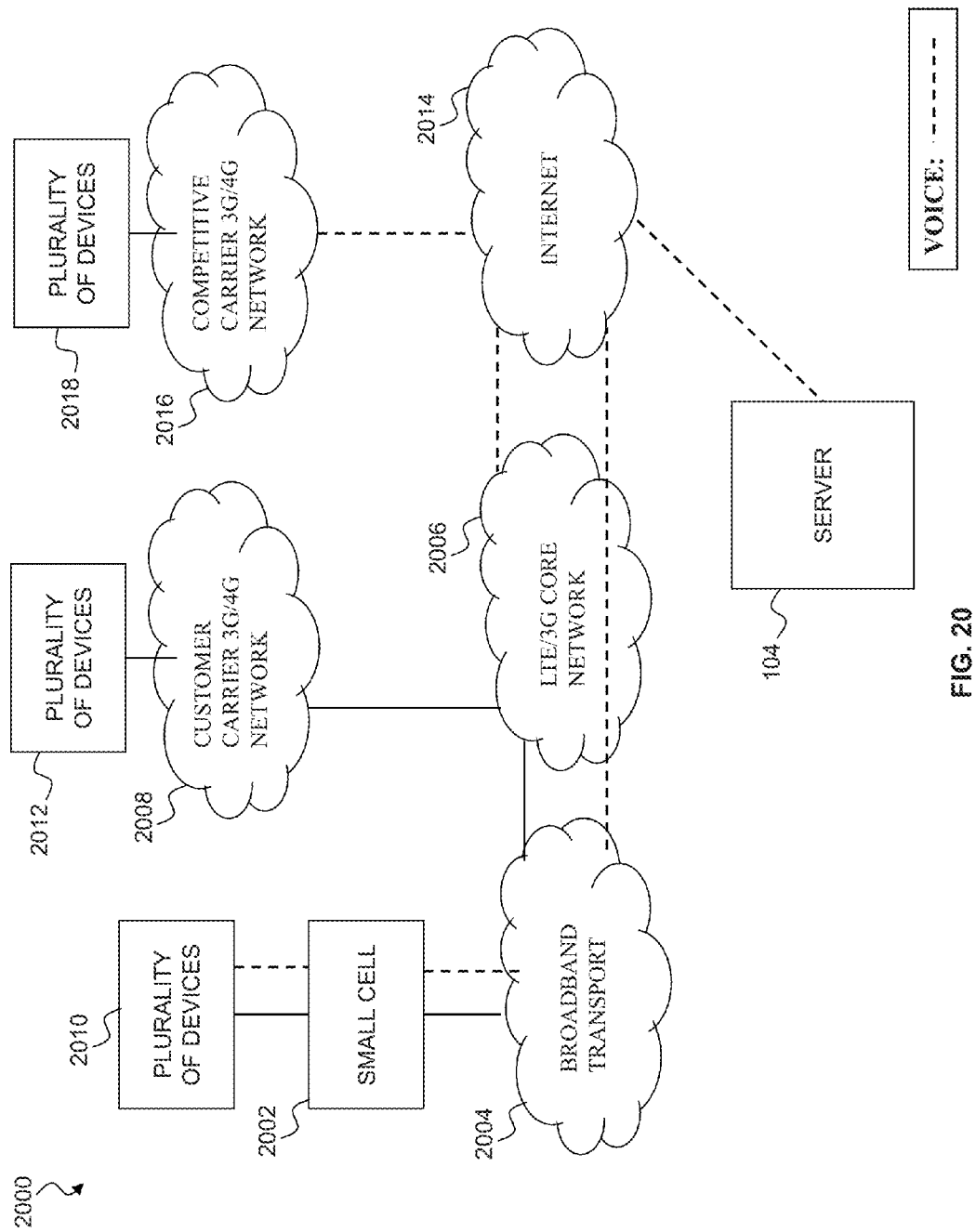
FIG. 20 illustrates one embodiment of a system for providing analysis of small cells and RF chambers.

Referring now to FIG. 20, there is illustrated a system 2000 for providing analysis of small cells or RF chambers. The system 2000 includes a small cell 2002 connected to broadband transport 2004, such as xDSL, cable, fiber, etc., which is in turn connected to a LTE/3G core network 2006, which also has connected therewith a customer carrier 3G/4G access network 2008. A plurality of devices 2010 is connected to the signal being provided by the small cell 2002 and another plurality of devices 2012 is connected to the customer carrier 3G/4G access network 2008. The small cell 2002 can support a certain number of phone enclosures with each enclosure having 4 to 8 different devices. The system 2000 further includes the server 104, an Internet network 2014, and a competitive carrier 3G/4G network 2016, which also has connected therewith a plurality of devices 2018. There is provided voice paths between the plurality of devices 2010 and the broadband transport 2004, between the broadband transport 2004, via the LTE/3G core network 2006, and the Internet network 2014, between the Internet network 2014 and the LTE/3G core network 2006, between the Internet network 2014 and the competitive carrier 3G/4G network 2016, and between the server 104 and the Internet network 2014. The system 2000 allows for independent devices enabled to run performance tests to perform detailed latency testing and benchmarks of the devices within the small cell area and RF chambers against the customer carrier network 3G/4G access network 2008 and the competitive carrier 3G/4G network 2016, in order to determine how the performance of the small cell devices measure against these other networks.

Figure 21:
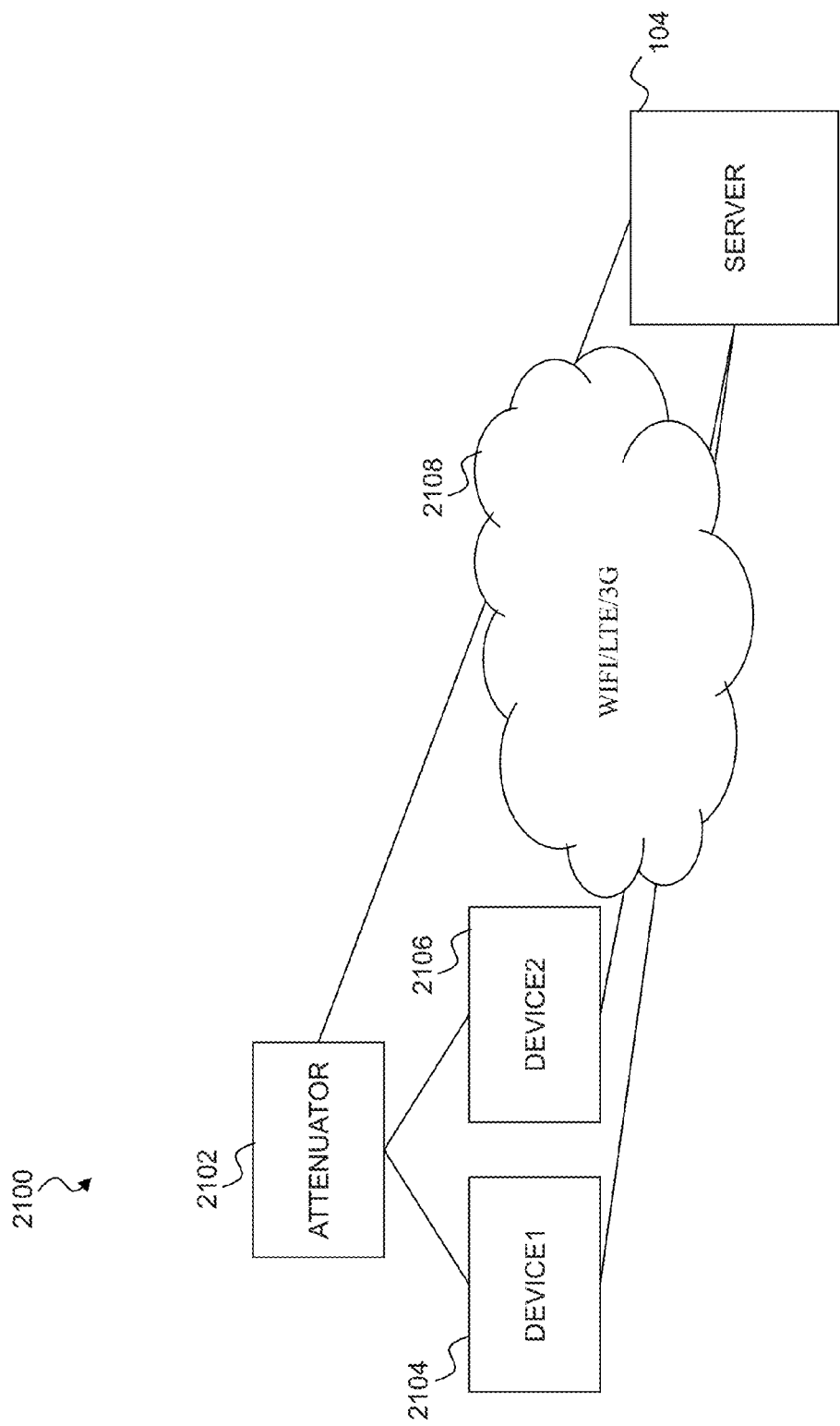
FIG. 21 illustrates one embodiment of an automated IRAT handover system.

Referring now to FIG. 21, there is illustrated an automated IRAT handover system 2100. The system 2100 includes an attenuator 2102 controlled by server 104. For instance, the server 104 may control the attenuator 2102 using a SetAttenuation command so that a first device 2104 and a second device 2106 have a strong WiFi signal. The server 104 sets up a long call between the first device 2104 and the second device 2106 using a MakeVoiceCall command. The call is then accomplished over the network 2108, in this case a WiFi network. However, the server 104 may change the attenuator so that another signal is stronger than the WiFi signal. For example, if the server 104 changes the attenuator to make the LTE signal stronger, it will cause the first device 2104 and the second device 2106 to handover to the LTE network. This can be repeated for any combination to cause different IRAT scenarios.

IRAT handover tests (2G to 3G to 4G to WiFi) can be performed in addition to cell change orders IRAT public land mobile network (PLMN) selection. The tests can be performed in a lab using an attenuator, or in the field using a SmartKIT.

The platform allows for various application analytics to be run on devices. This allows for better understanding and the improvement of application user experience, measuring the impact of applications on the device and the network, collection of device KPIs and data consumption for one or more apps, benchmarking KPIs across devices, application or access types, and gathering of app analytics by integrations OT's SDK or interfacing with OT's App_Service. Metrics for app analytics include: active users, new users, version, benchmarks, carriers, acquisition, location, crash analytics, page views, device type, firmware, usage frequency, retention, language lifecycle, user paths, segmentation, conversions, sessions, time of day, category, button clicks, sales, video view, and other custom metrics.

Figure 22:
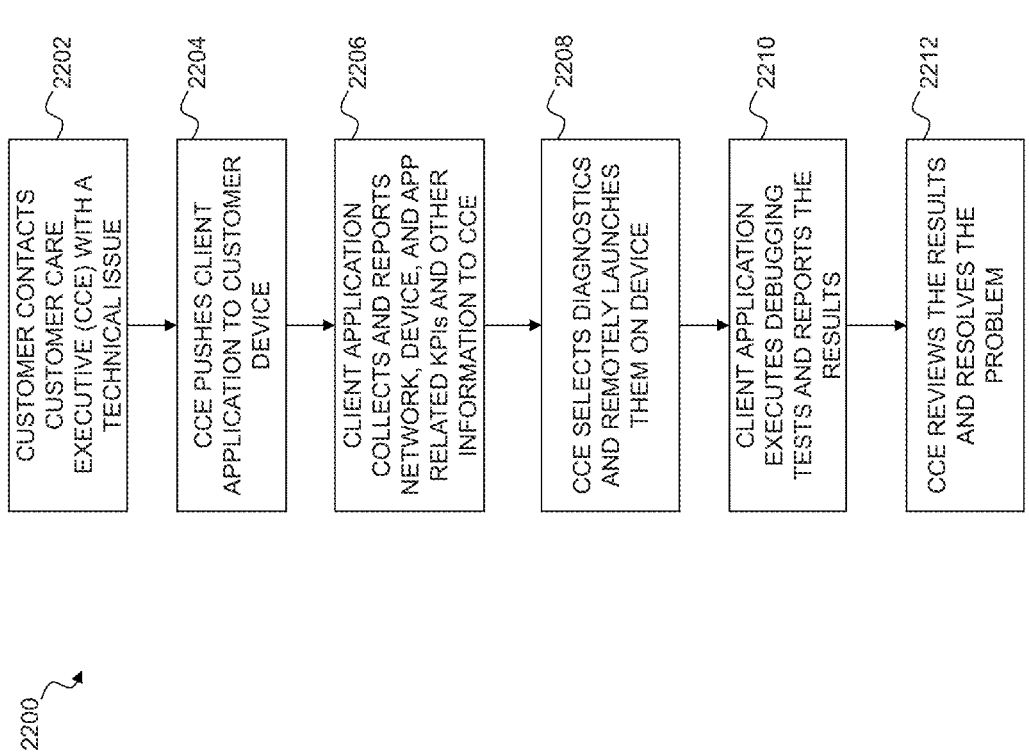
FIG. 22 illustrates a flowchart of one embodiment of a customer device troubleshooting and resolution method.

Referring now to FIG. 22, there is illustrated a flowchart of a customer device troubleshooting and resolution method 2200. At step 2202, a customer contacts a customer care executive (CCE) with a technical issue. At step 2204, the CCE pushes the client application (IA client) to the customer's device using over-the-air (OTA) standard, or via some other known means. At step 2206, the client application collects and reports network, device, and app related KPIs and other information to CCE. At step 2208, the CCE selects diagnostics and remotely launches them on the customer's device. At step 2210, the client application executes debugging tests and reports the results. At step 2212, the CCE reviews the results and resolves the problem.

The client application (IA client) is capable of testing a variety of device parameters, including hardware and software, as well as services. Functional testing is provided, including testing of basic services such as telephony (voice and data), messaging, and multimedia, VQT (MOS/PESQ/POLQA), video quality (MOS/PSNR/etc.), and accessories including the battery, memory, SD card USB, camera, chargers, Bluetooth, data cables, display, temperature, and GPS. Benchmarking and performance testing is also provided, including benchmarking the testing the processor, memory, SD card, GPS, WiFi, Bluetooth, graphics, video streaming, data services, voice services, VoLTE/VoWiFi, and SMS/MMS/RCS. IRAT testing can also be provided, including interRAT cell selection, interRAT handovers, interRAT cell change order, PLMN selection, APN, selection, and L1 to L3 measurements. Conflict/negative testing can also be performed, including testing predefined state against predefined events, messaging and telephony interactions, multimedia interactions, memory and phonebook interactions, and LTE/WiFi handovers.

Stability testing can also be performed. The purpose of stability testing is to identify scenarios or events which result in unstable behavior of the handset, or render it in an unresponsive state. Various inputs for stability testing may be provided, including conflict testing (states×events), random events, boundary checks, error handling, soak tests, processor/memory loading, and interoperability scenarios. These can be monitored for device or application device or application freeze or lock up, forced application shut down, OS reboot, device power cycle, excessively slow response times, or non-graceful recovery. Results of the stability testing can then be captured, with captures including processor load, memory usage, application/system logs, or bandwidth utilization.

Stress/soak testing is also provided, including repeat functional tests and continuous testing (even at 24 hours a day/seven days a week), feature interaction and conflict tests, restarts/reboots, WiFi to cellular switching, and GPS/BT/WiFi on/off tests. The purpose of stress testing is to measure the device's capability to perform various tasks consistently (and often simultaneously) for a long duration or time period (1 to 7 days). The platform allows for any number of test cases to be programmed to run in a loop, in sequence, or randomly for a defined period of time.

Random testing may also be performed, including functional tests, ad hoc, randomized operations, with no predefined sequence or procedures. Device testing can be done manually or automated.

Device software such as the OS, Baseband, and applications can be tested. Sercies can be tested including voice, data, video, and messaging. Voice testing can include VoLTE accessibility, VoLTE retainability, CSFB, SRVCC, VoWiFi accessibility and retainability, VoWiFi/VoLTE handover, OTT, push to talk, and voice quality test (MOS/PESQ/POLQA). Data testing includes upload or download throughput of HTTP, FTP, UDP, TCP, network latency, and web browsing. Video testing includes video streaming latency and buffering and video quality test (MOS/PSNR). Messaging testing includes SMS or MMS delivery time and success rate. Scorecards for the tests can be generated for the devices.

Reverse logistics results in sunk costs for operators and device OEMs. However, the platform reduced this problem by allowing for remote diagnostics and certification, including the ability to diagnose devices at the point of sales/returns, to manage configuration, and to track devices throughout the process. In addition, the platform allows for quicker and detailed diagnostics, reduced E2E time, automation of certification process for refurbished devices, and enabling of sales and customer support teams with a simple click.

The platform also allows for certifying pre-owned devices. Pre-owned devices include, but are not limited to, phones, mobile phones, smart phone, tablets, computers, cameras, smoke detectors, alarm systems, sensors, wearables, IoT, home appliances, televisions, set top boxes, and any electronic equipment. The pre-owned device may be evaluated, priced, and offered for sale without the need of the operator to ever physically touch the pre-owned device. The operator may remotely perform the necessary steps. An application or App is loaded on to the pre-owned device through methods known to those skilled in the art. The application is then initialized and launched. A remotely located software program located on an internet website, server, in the cloud, or other hardware system communicates with the application. An operator, either through direct manipulation or pre-programmed instructions, gains access to the pre-owned device and controls the actions of the pre-owned device and the data collection from the pre-owned device. The operator may be an employee or agent of an original equipment manufacturer ("OEM"), a service provider, such as AT&T or Verizon ("SP"), a potential customer, or any other entity. The operator, through use of the software program and application, evaluates and analyzes the pre-owned device. A wide variety of data may be collected and analyzed without detracting from the spirit of the invention. Based upon the data collected and analyzed, a price for the preowned device is determined. The price may be communicated to a specific individual, a specific entity, or may be communicated to a broker or exchange to be offered for sale. The user may offer his pre-owned device for evaluation, pricing, and for sale by only allowing the installation of the application. The operator may conduct all necessary evaluation, investigation, and data collection without ever touching the device and may perform these steps remotely such as across the state, country, or globe. End users may conduct the business of selecting and buying a preowned d device solely through a web-based system.

In conjunction with the evaluation, investigation and data collection, the operator may offer certifications verifying the status of the evaluations. Such certifications may be electronic or hard copies. Electronic certifications may be maintained on the pre-owned device, on a network, in the cloud, or other hardware location. The operator may prepare a wide variety of certifications, including variations directed toward the type of pre-owned device, the manufacturer, the service provider, or other similar trait. Certifications may take the form of known evaluation or may be provided as an addendum to known certification programs, including but not limited to Carfax. The certification data may be stored in a long-term storage device. The operator may also mine the data, perform predictive analysis, and collate and correlate the data. The certification process may be fully automated or may require the assistance of an operator during the evaluation.

The system and method disclosed herein may increase the revenue generated by pre-owned devices through the use of consistent and certifiable evaluations, reduce the costs associated with the offering for sale of such pre-owned devices, reduce the costs associated with the locating and evaluation pre-owned devices, while improving the overall customer experience and confidence in purchasing the pre-owned device. Additionally, a sales or payment channel may be implemented, including known channels such as Paypal.

The processes for certification, pricing, analytics, and automation of providing used devices is dubbed iVALUE. It is used to certify smartphones and tablets, solve OEM, SP, and consumer needs, and to provide app and network analytics. It provides app based certification of smartphones and tablets, a repository of certification data for data mining, pricing algorithms and index marking, certificates and reports for consumers, OEMs, and SPs, automated processes for FUT, reverse logistics, etc., and a web-based transaction interface between end-users. The market for such is segmented between the B2C market, the B2B—service providers market, the B2B—reverse logistics market, and the B2B—OEMs market. Value is provided to these market segments. Specifically, the B2B segment enjoys increased revenue for re-furbished devices, massive cost reduction due to iVALUE automation, and improved product quality and customer experience due to iVALUE analytics. The buyer in the B2C market enjoys peace of mind and assurance that the purchase is legitimate. The seller in the B2C market enjoys the improvement of the sale price and secure sales channels such as PayPal for device transactions.

Figure 23:
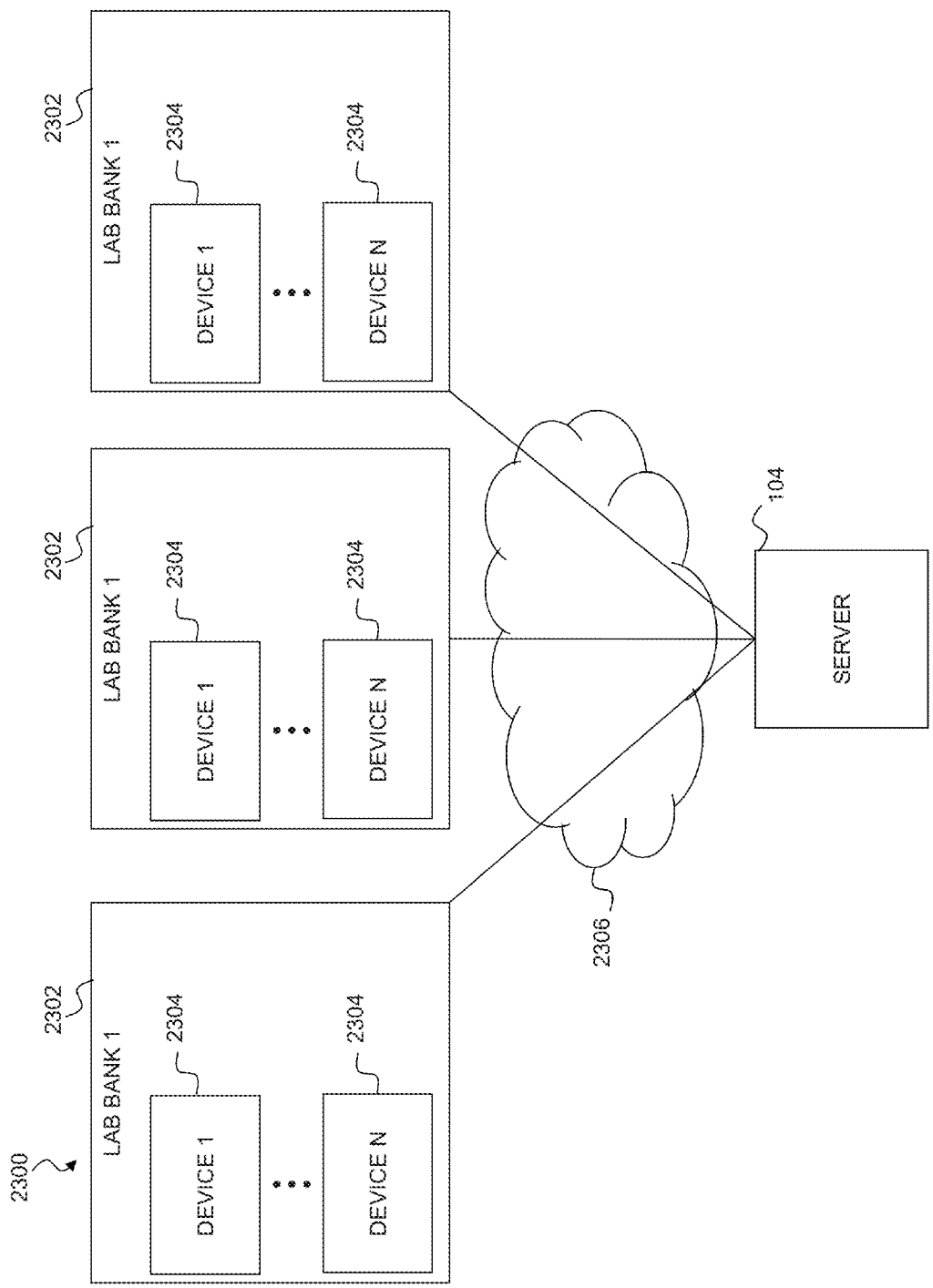
FIG. 23 illustrates one embodiment of a parallel device lab testing system.

Referring now to FIG. 23, there is illustrated a parallel device lab testing system 2300. The system 2300 includes a plurality of lab banks 2302. The plurality of lab banks 2302 each have housed within a plurality of devices 2304. The plurality of devices may be any type of wireless device. In some embodiments, the plurality of lab banks 2302 would each contain the same type of device (Android smartphones, for example), in order to test the same types of devices over different networks, to test the same types of devices in different locations, or under different operating conditions. In other embodiments, the plurality of lab banks 2302 may test different types of devices (iOS tablets, Android smartphones, Windows PCs, etc.). The plurality of lab banks 2302 and/or the plurality of devices 2304 are connected via a network 2306 to the server 104 in order to perform the tests described herein. In addition, lab testing can be used to simulate load generation on a network to test network performance (such as WiFi network performance). Such may also be applied to test large event (sports stadiums, city social events, etc.) network performance. Devices can be connected to large event network. Then, multiple data sessions on each device can be launched, such as multiple data download sessions, multiple data upload sessions, and multiple video streaming in parallel, to test the effect of the load on the network.

Figure 24:
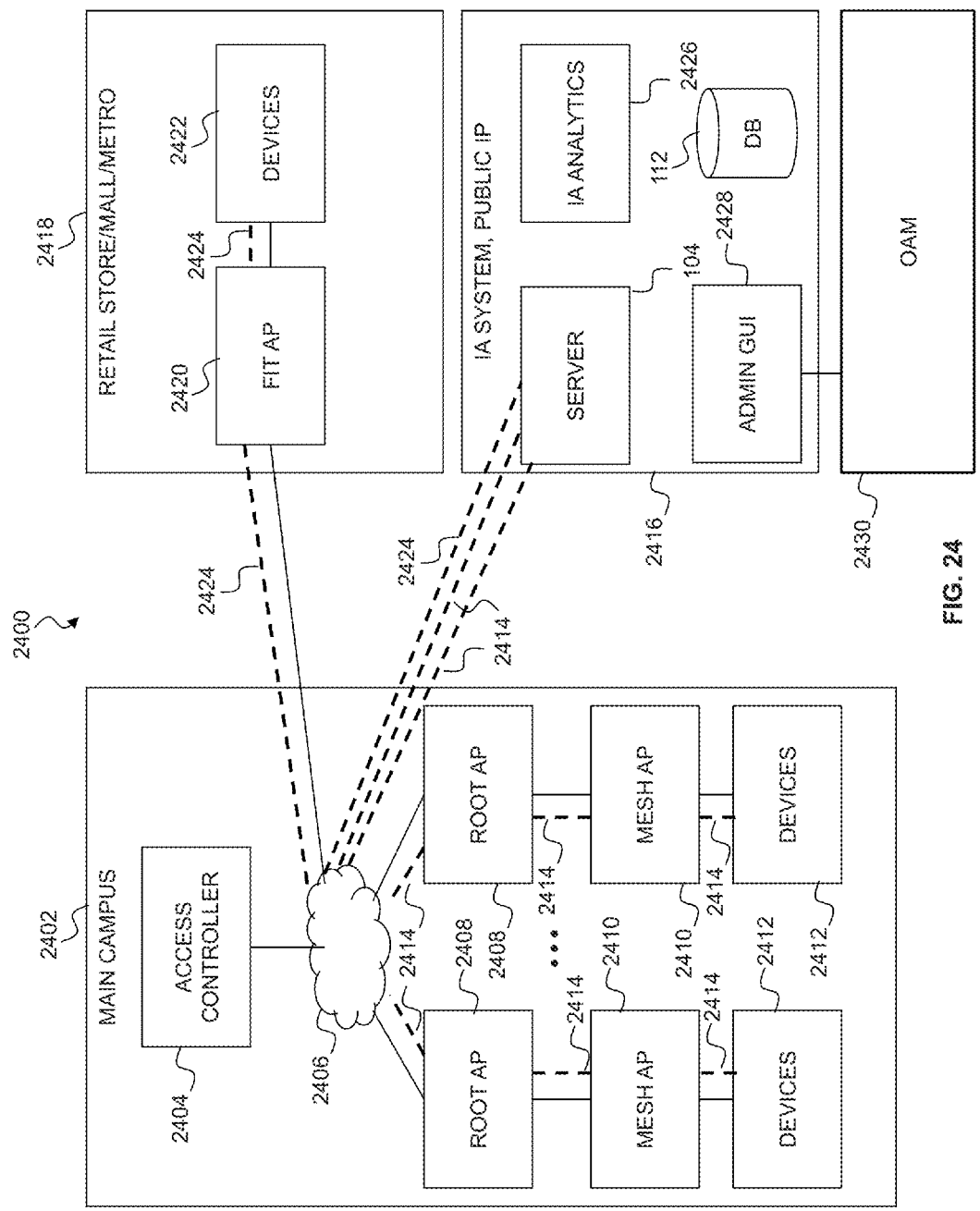
FIG. 24 illustrates one embodiment of a WiFi end-to-end testing system.

Referring now to FIG. 24, there is illustrated one embodiment of a WiFi end-to-end testing system 2400. The system 2400 includes a main campus 2402. The main campus 2402 may be any location that supports multiple internet connections for devices, such as a school, a sports stadium, a live concert event, or other locations. The main campus 2402 includes an access controller 2404 connected to an Internet network 2406. The main campus 2402 further includes a plurality of root access points 2408, each connected to a mesh access point 2410, with each access point 2410 having a plurality of devices 2412 connected thereto. The plurality of devices 2412 may be running a wireless client or an Ethernet client, and may be any type of device, such as a PC, a smartphone, a camera, or any other device capable of connected to a network access point. Voice and/or data paths 2414 may be created from the plurality of devices 2412, passing through the mesh access points 2410, the root access points 2408, and traveling over the Internet network 2406 to reach the server 104 located on an intelli-agent (IA) system 2416.

The system 2400 may further include an establishment 2418 such as a retail store, a mall, or some other establishment. The establishment 2418 may include a FIT access point 2420 having a plurality of devices 2422 connected thereto. A FIT access point is an access point that may handle its own encryption, but delegates connection management and authentication to an access controller, such as access controller 2404. The FIT access point 2420 is connected to the Internet network 2406 of the main campus 2402. A voice and/or data path 2424 may be formed from the plurality of devices 2422, passing through the FIT access point 2420, and traveling over the Internet network 2406 to reach the server 104.

The IA system 2416 may, in addition to the server 104, include an IA analytics module 2426, the database 112, and an admin GUI 2428. The admin GUI 2428 may provide a user interface to an operations, administration, and management (OAM) module 2430. The OAM module 2430 may allow for various monitoring and testing of the system 2400 to be executed, including ping reports (carrier performance, carrier network type matrix, ping latency trend, ping latency distribution), data connection reports (carrier performance, carrier network type matrix, data set up time trend), downloading reports (carrier performance, carrier network type matrix, download speed trend, download speed distribution), uploading reports (carrier performance, carrier network type matrix, upload speed trend, upload speed distribution) SMS reports (carrier performance, inter-carrier matrix, carrier city matrix, destination performance, distribution, trends), and voice call reports (carrier performance, inter carrier matrix, carrier city matrix, destination performance, distribution, trends).

WiFi E2E testing may also include the automation of E2E alpha testing or FOA for WLAN. The basic features of this testing may include recording location (altitude, longitude, latitude) of testing spot, recording AP SSID and AP MAC, authentication type and WiFi mode, measuring WiFi RSSI (signal level), channel, and SNR (signal noise ratio), running ping testing, recording ping latency, and ping loss rate, and downloading files, uploading files, and recording download and upload throughput. Advanced features of WiFi E2E testing include running SIP call (VoIP), recording voice latency, voice MOS (mean opinion score), switching terminal between WiFi and 4G, recording roaming latency, switching terminal among APs of one WLAN, recording roaming latency, making groups of terminal join certain SSIDs and recording performance of certain AP from terminals, measuring max number of terminals that can join a particular AP, and measuring RSSI of other SSIDs (other than that which client application is connected).

WiFi offload testing may also be performed. This testing may include roaming tests (WiFi to 3G/LTE and vice versa), including authentication and security testing, latency tests, throughput tests (single client TCT/UDP download/upload, multiple client TCP/UDP download/upload, HTTP download/upload, mixed mode download/upload), and VoIP calls testing, for in and out roaming.

Figure 25:
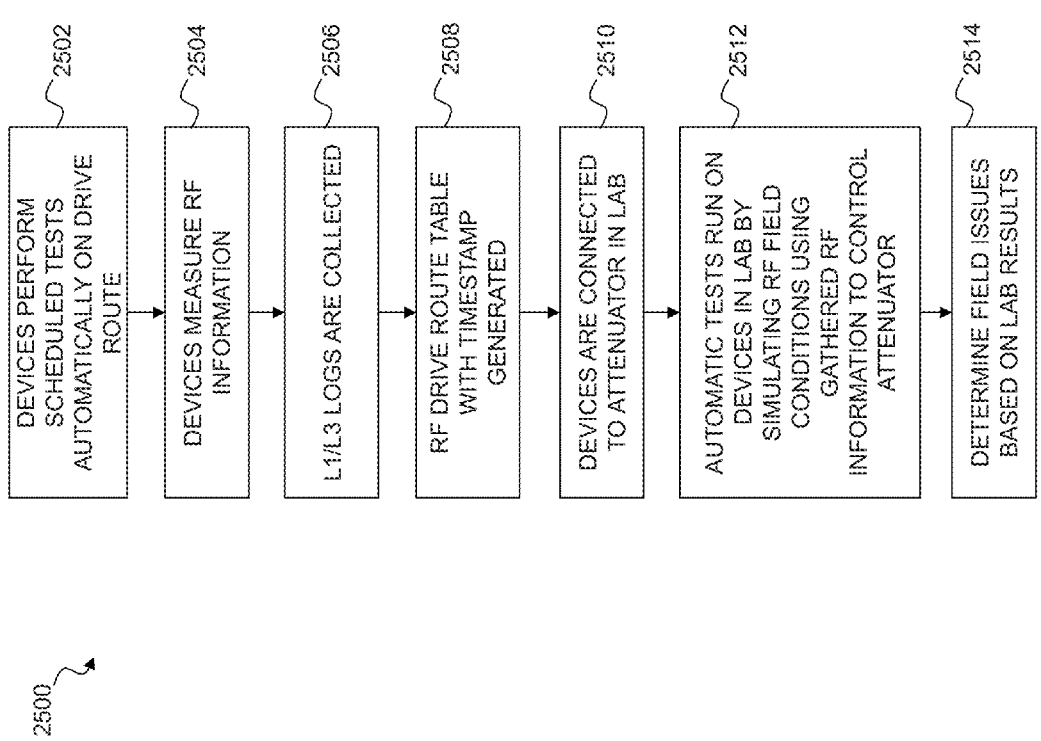
FIG. 25 illustrates a flowchart of one embodiment of a drive test IRAT automation test method.

Referring now to FIG. 25, there is illustrated a drive test IRAT automation test method 2500. At step 2502, devices perform scheduled tests automatically while on a drive route. At step 2504, the devices measure RF information on the route, such as LAC/cell ID, PCI, RSRP, and RSRQ. At step 2506, L1/L3 logs are collected on rooted devices or by QXDM. At step 2508 an RF drive route table with timestamps is generated by parsing QXDM and correlation of RF information captured from devices. At step 2510, the devices are connected to an attenuator in a lab. The attenuator may connect to different RF signals (LTE, 3G, 2G, WiFi, etc.). At step 2512, automatic tests are executed on the devices in the lab by simulating RF field conditions using the gathered RF information to control the attenuator. At step 2514, the results of the lab tests are reviewed to determine field issues.

Figure 26:
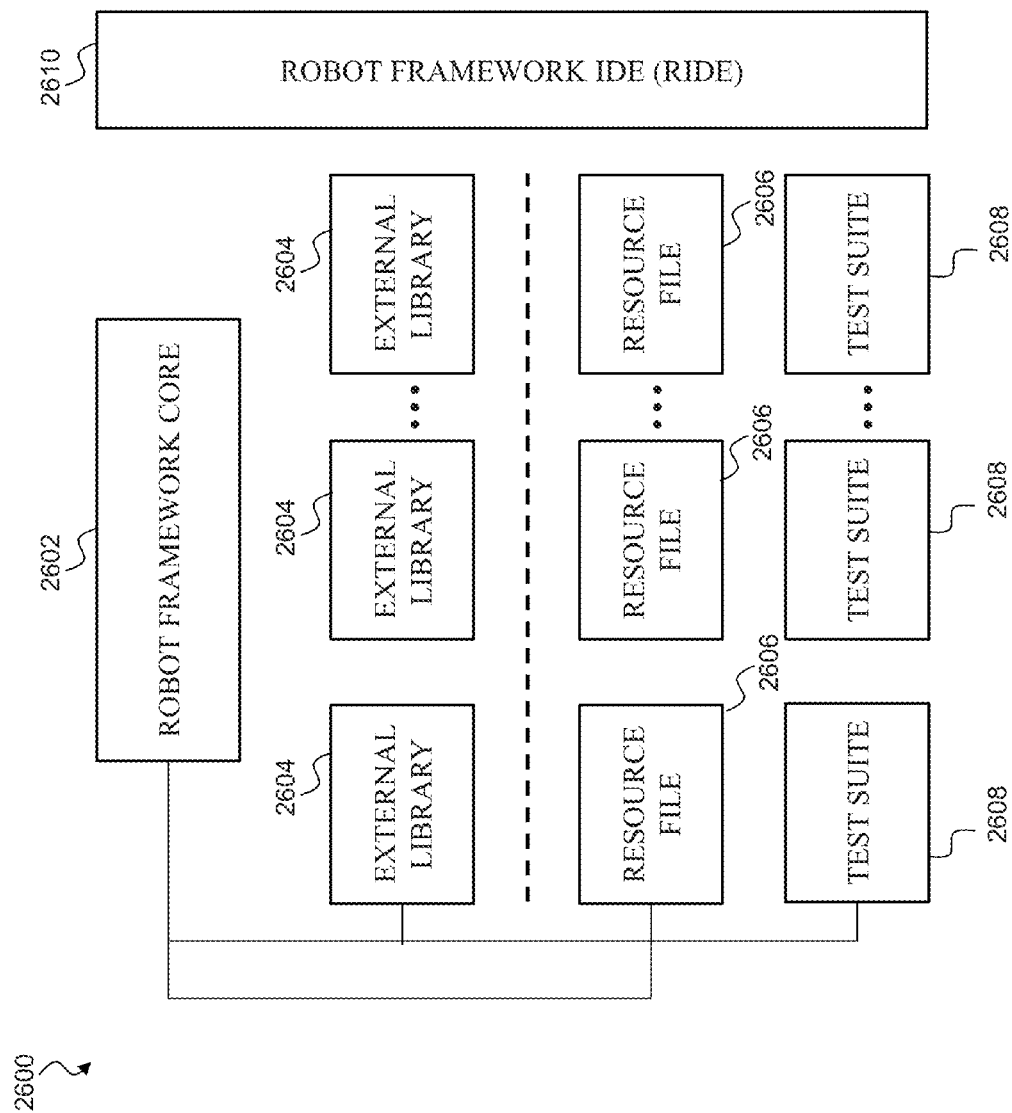
FIG. 26 illustrates a diagram of one embodiment of an IA development environment.

Referring now to FIG. 26, there is illustrated a diagram of an IA development environment 2600. The environment 2600 includes a robot framework core 2602 including standard libraries and reporting functionality. The core 2602 is connected to a plurality of external libraries 2604, a plurality of resource files 2606, and a plurality of test suites 2608. The core 2602, plurality of external libraries 2604, the plurality of resource files 2606, and the plurality of test suites 2608 all reside as part of a robot framework IDE (RIDE) 2610. The environment 2600 may allow for a GUI-driven fully automated integration methodology to add new network elements into the IA portfolio. A tabular interface may be used for importing new commands, allowing for a CSV file with commands and parameters to be imported. The GUI may further be used to create test scripts, which allowing commands to be dragged/dropped on build test scripts and having a distributed domain-driven design (DDDD). Further, on-demand or scheduled execution of tests may be performed, allowing for communication with network elements, probes, and devices in cellular or WiFi networks, as well as allowing for gathering of traces, logs, KPIs from RAN, backhaul and core network elements including IMS, EPC, and BSS.

UMTS is one example of the cellular radio access technology that allows the mobile handset to connect to the wireless network. However, the system and method disclosed herein also applies to any type of cellular radio access network technology that allows a mobile cellular handset to connect and establish communication with a wireless or any other type of network such as data network. Some examples of such other radio access network technology include but not limited to GSM, CDMA, CDAM-1x, WCDMA, EVDO, EDGE, LTE, Advanced-LTE, WiMax and many more.

In addition, although the system and method disclosed herein is described using FTP or SFTP as the transfer protocol, a wide variety of Transfer protocol over IP (Internet Protocol) may be used to transport the IA uplink report content over IP to the network entity.

The system and method described herein is independent of the mobile handset and may be applied to any mobile handset device that supports IP data connection to the open internet, or Short Message Service, or both.

Furthermore, the IA report format disclosed herein is in text format. However the system and method may implement any format type that may represent the information of the report. Such format types include but not limited to text, comas separated vectors, binary and others.

In addition, the system and method disclosed herein uses certain protocols as means of communication between the different entities. However, a wide variety of protocols may be implemented that enable communications to occur throughout the various components such as Signaling System 7 (SS7) Integrated Services Digital Network (ISDN) User Part, known collectively as SS7 ISUP, or Internet Protocol (IP), or General Packet Radio System (GPRS) Tunneling Protocol User (GTP-U) for user data and GTP-C for signaling, File Transfer Protocol (FTP), Secure-FTP (S-FTP), HTTP, XML, and others.

Furthermore, even though Android was used as the mobile Operating System (OS) to describe some of the functionality of the system and method, a wide variety of OS may be implemented and used on any mobile handset such as Symbian, Brew, IOS, QIX and others.

It should be apparent from the foregoing that an invention having significant advantages has been provided. While the invention is shown in only a few of its forms, it is not just limited but is susceptible to various changes and modifications without departing from the spirit thereof.

Although the invention is described herein with reference to specific embodiments, various modifications and changes can be made without departing from the scope of the invention as set forth in the claims below. Accordingly, the specification and figures are to be regarded in an illustrative rather than a restrictive sense, and all such modifications are intended to be included within the scope of the invention. Any benefits, advantages, or solutions to problems that are described herein with regard to specific embodiments are not intended to be construed as a critical, required, or essential feature or element of any or all the claims.

From time-to-time, the invention is described herein in terms of these example embodiments. Description in terms of these embodiments is provided to allow the various features and embodiments of the invention to be portrayed in the context of an exemplary application. After reading this description, it will become apparent to one of ordinary skill in the art how the invention can be implemented in different and alternative environments. Unless defined otherwise, all technical and scientific terms used herein have the same meaning as is commonly understood by one of ordinary skill in the art to which this invention belongs.

The preceding discussion is presented to enable a person skilled in the art to make and use the invention. The general principles described herein may be applied to embodiments and applications other than those detailed below without departing from the spirit and scope of the invention as defined by the appended claims. The invention is not intended to be limited to the embodiments shown, but is to be accorded the widest scope consistent with the principles and features disclosed herein.

In addition, while a particular feature of the invention may have been disclosed with respect to only one of several embodiments, such feature may be combined with one or more other features of the other embodiments as may be desired. It is therefore, contemplated that the claims will cover any such modifications or embodiments that fall within the true scope of the invention.

The various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one", "one or more" or the like; and adjectives such as "conventional", "traditional", "normal", "standard", "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more", "at least", "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

Unless stated otherwise, terms such as "first" and "second" are used to arbitrarily distinguish between the elements such terms describe. Thus, these terms are not necessarily intended to indicate temporal or other prioritization of such elements.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for wireless network optimization and remote control of mobile device operation, the method comprising:
   pushing, from a server, a client application to one or more devices;
   instructing the client application to perform a plurality of tests on the one or more devices;
   collecting by the server a plurality of reports corresponding to the plurality of tests performed on the on the one or more devices;
   instructing the client application to perform debugging operations on the one or more devices;

collecting by the server debugging results corresponding to the debugging tests performed on the one or more devices;

accessing remotely the one or more devices to resolve operational problems of the one or more devices;

wherein the plurality of tests include a video test; and wherein the video test includes the steps of:

sending from the server to at least one of the one or more devices a command to play and record a video, comparing by the server the recorded video against a reference video file, and generating by the server a video quality report.

2. A method for wireless network optimization and remote control of mobile device operation, the method comprising:

pushing, from a server, a client application to one or more devices;

instructing the client application to perform a plurality of tests on the one or more devices;

collecting by the server a plurality of reports corresponding to the plurality of tests performed on the on the one or more devices;

instructing the client application to perform debugging operations on the one or more devices;

collecting by the server debugging results corresponding to the debugging tests performed on the one or more devices;

accessing remotely the one or more devices to resolve operational problems of the one or more devices;

wherein the plurality of tests include a video test; and wherein the video test includes the steps of:

sending from the server to at least two devices a command to play a video at a predetermined interval, and collecting video quality test results from the at least two devices.

3. The method of claim 2, wherein the predetermined interval is every ten minutes.

4. A method for wireless network optimization and remote control of mobile device operation, the method comprising:

pushing, from a server, a client application to one or more devices;

instructing the client application to perform a plurality of tests on the one or more devices;

collecting by the server a plurality of reports corresponding to the plurality of tests performed on the on the one or more devices;

instructing the client application to perform debugging operations on the one or more devices;

collecting by the server debugging results corresponding to the debugging tests performed on the one or more devices;

accessing remotely the one or more devices to resolve operational problems of the one or more devices;

wherein the plurality of tests include a video test; and wherein the voice test includes the steps of:

sending from the server to a first one of the one or more devices a command to initiate a voice call, sending from the server to a second one of the one or more devices a command to answer the voice call, sending from the server to a third one of the one or more devices a command to play a reference audio file, wherein the third one of the one or more devices is connected to the first one of the one or more devices, sending from the server to a fourth one of the one or more devices a command to record audio, wherein the fourth one of the one or more devices is connected to the second one of the one or more devices, and wherein the fourth one of the one or more devices records audio produced by the second one of the one or more devices, the audio being played from the reference audio file by the third one of the one or more devices and transmitted by the first one of the one or more devices, comparing by the server the recorded audio to a reference audio file, and generating by the server voice quality test results.

5. The method of claim 4, wherein the voice test includes the steps of:

initiating by the server a conference call using a bridge, the conference call being between a first one of the one or more devices, a second one of the one or more devices, a third one of the one or more devices, a fourth one of the one or more devices, and a fifth one of the one or more devices;

sending by the server a command to play a reference audio file to a sixth one of the one or more devices, the sixth one of the one or more devices being connected to the first one of the one or more devices;

sending by the server a command to record audio to a seventh one of the one or more devices, an eighth one of the one or more devices, a ninth one of the one or more devices, and a tenth one of the one or more devices, the seventh one of the one or more devices being connected to the second one of the one or more devices, the eighth one of the one or more devices being connected to the third one of the one or more devices, the ninth one of the one or more devices being connected to the fourth one of the one or more devices, and the tenth one of the one or more devices being connected to the fifth one of the one or more devices;

comparing the recorded audio from each of the seventh, eighth, ninth, and tenth one of the one or more devices to a reference audio file; and generating by the server a voice quality test report.

6. The method of claim 5, wherein the first and sixth ones of the one or more devices are connected to the bridge over a WiFi network, the second and seventh ones of the one or more devices are connected to the bridge over an LTE network, the third and eighth ones of the one or more devices are connected to the bridge over a VoIP network, the fourth and ninth ones of the one or more devices are connected to the bridge over an IP network using a proprietary communications application, and the fifth and tenth ones of the one or more devices are connected to the bridge over a 3G network.

* * * * *